United States Patent
Furuta

(10) Patent No.: US 11,079,699 B2
(45) Date of Patent: Aug. 3, 2021

(54) EXPOSURE HEAD AND IMAGE FORMING APPARATUS

(71) Applicant: CANON KABUSHIKI KAISHA, Tokyo (JP)

(72) Inventor: Yasutomo Furuta, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/087,746

(22) Filed: Nov. 3, 2020

(65) Prior Publication Data
US 2021/0048761 A1    Feb. 18, 2021

Related U.S. Application Data

(63) Continuation of application No. PCT/JP2019/023101, filed on Jun. 11, 2019.

(30) Foreign Application Priority Data

Jun. 12, 2018 (JP) .............................. JP2018-111927

(51) Int. Cl.
  *G03G 15/043* (2006.01)
  *G03G 15/04* (2006.01)

(52) U.S. Cl.
  CPC ..... *G03G 15/043* (2013.01); *G03G 15/04036* (2013.01); *G03G 15/04054* (2013.01)

(58) Field of Classification Search
  CPC ....... G03G 15/04036; G03G 15/04045; G03G 15/04054; G03G 15/04063; G03G 15/043; B41J 2/447; B41J 2/45; B41J 2/451; H04N 1/036
  See application file for complete search history.

(56) References Cited

U.S. PATENT DOCUMENTS

| | | | |
|---|---|---|---|
| 5,084,714 A | 1/1992 | Beaman et al. | |
| 2009/0079364 A1* | 3/2009 | Nagumo | G03G 15/326 315/294 |
| 2011/0037826 A1* | 2/2011 | Itou | G03G 15/326 347/257 |

(Continued)

FOREIGN PATENT DOCUMENTS

| CN | 102163027 A | 8/2011 |
|---|---|---|
| JP | H04-39068 A | 2/1999 |

(Continued)

OTHER PUBLICATIONS

International Search Report and Written Opinion for International Patent Application No. PCT/JP2019/023101, dated Jul. 9, 2019.

*Primary Examiner* — Carla J Therrien
(74) *Attorney, Agent, or Firm* — Venable LLP

(57) ABSTRACT

An exposure head that exposes a photosensitive member to light includes a plurality of light-emitting element array chips mounted on one surface of a board, a connector mounted on the other surface of the board, and a first driver IC and a second driver IC that are connected to the connector and drive the light-emitting element array chips, wherein the first driver IC is placed on one side of the board with respect to the connector in the longitudinal direction of the board, and the second driver IC is placed on the other side of the board with respect to the connector in the longitudinal direction of the board.

18 Claims, 18 Drawing Sheets

(56) References Cited

U.S. PATENT DOCUMENTS

| | | | |
|---|---|---|---|
| 2011/0205327 A1 | 8/2011 | Inoue et al. | |
| 2012/0249715 A1 | 10/2012 | Ohno | |
| 2015/0370193 A1* | 12/2015 | Okazaki | G03G 15/0409 347/118 |
| 2017/0201643 A1* | 7/2017 | Shiraishi | G03G 15/043 |
| 2019/0179252 A1 | 6/2019 | Iwai et al. | |
| 2019/0384205 A1* | 12/2019 | Furuta | H04N 1/3935 |
| 2020/0150554 A1* | 5/2020 | Furuta | G03G 15/04054 |
| 2021/0088928 A1* | 3/2021 | Nakanishi | G03G 15/04054 |

FOREIGN PATENT DOCUMENTS

| | | |
|---|---|---|
| JP | H11-320957 A | 11/1999 |
| JP | 2011-173288 A | 9/2011 |
| JP | 5760586 B2 | 8/2015 |
| JP | 2019-098709 A | 6/2019 |

* cited by examiner

⊗ ΦW1 TO ΦW4 TERMINALS 306

⊘ TERMINALS 307a AND 307b FOR Φ1-, Φ2-, AND Φs-SIGNALS AND IMAGE CONTROLLER SIGNAL

○ POWER-SUPPLY/GROUND TERMINAL 308

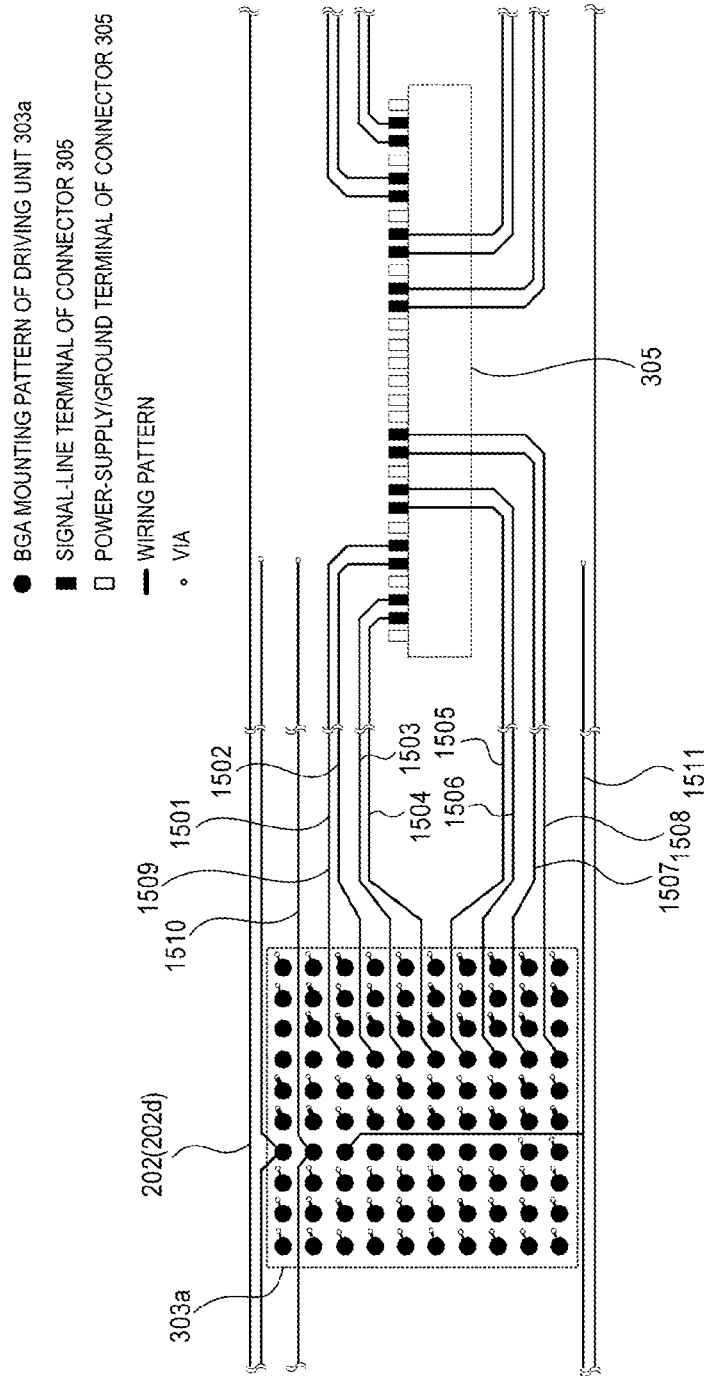

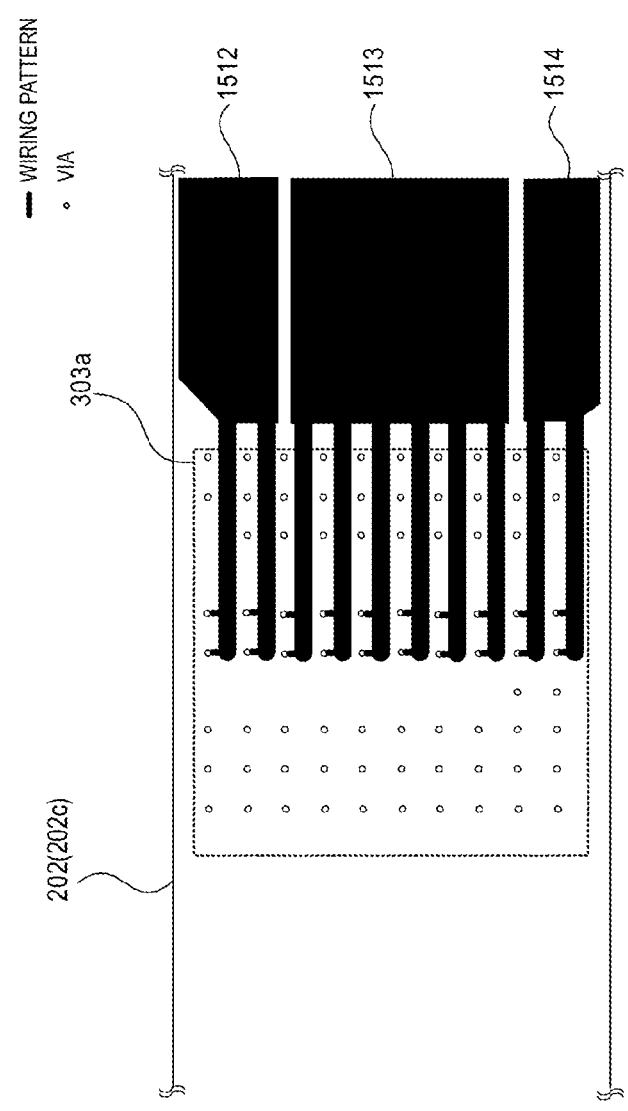

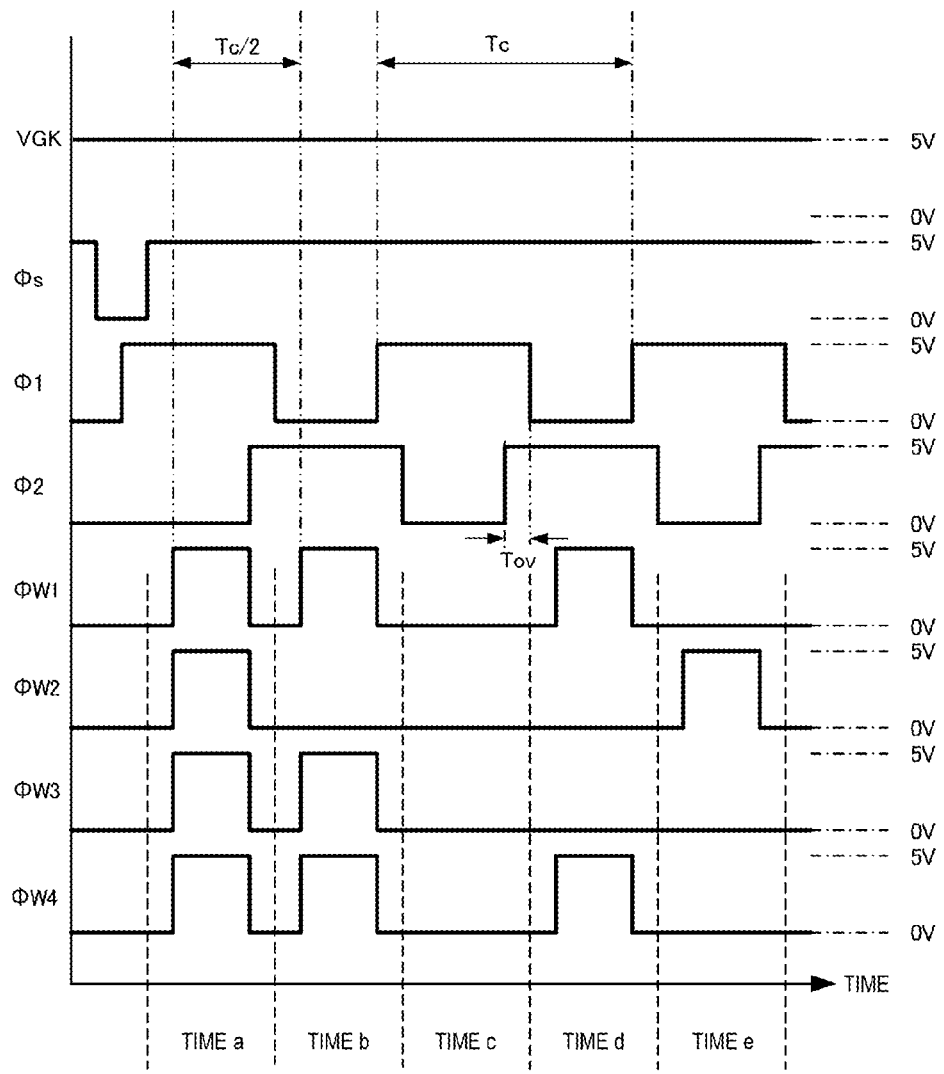

● IMAGE-CONTROLLER-SIGNAL TERMINAL 307a
⊗ ΦW1-ΦW4 TERMINALS 306
⊘ Φ1-, Φ2-, AND Φs TERMINALS 307b
○ POWER-SUPPLY/GROUND TERMINAL 308

EXPOSURE HEAD AND IMAGE FORMING APPARATUS

CROSS-REFERENCE TO RELATED APPLICATIONS

This application is a Continuation of International Patent Application No. PCT/JP2019/023101, filed Jun. 11, 2019, which claims the benefit of Japanese Patent Application No. 2018-111927, filed Jun. 12, 2018, both of which are hereby incorporated by reference herein in their entirety.

BACKGROUND OF THE INVENTION

Field of the Invention

The present invention relates to an exposure head and an image forming apparatus including the exposure head.

Description of the Related Art

With regard to an electrophotographic printer, there is generally known a technique of exposing a photosensitive drum to light with an exposure head that uses LEDs, organic ELs, or the like to form a latent image. The exposure head includes an array of light-emitting elements arranged along the longitudinal direction of the photosensitive drum and a rod lens array that images light emitted from the array of light-emitting elements on the photosensitive drum. With regard to the LEDs or the organic ELs, there is known a configuration having a surface light-emitting form (hereinafter referred to as a surface light-emitting element array) in which an irradiation direction from a light-emitting surface is identical to that from the rod lens array.

The length of longitudinal direction of the array of light-emitting elements depends on the width of an image area on the photosensitive drum, and an element spacing depends on the resolution of a printer. For example, in a case of a 1200-dpi printer, a pixel spacing is 21.16 µm (digits after the third decimal place are rounded down), and thus an element spacing is 21.16 µm. In the surface light-emitting element array, the light-emitting elements are arranged along the same direction as lenses in the rod lens array. For this reason, the surface light-emitting element array is adhered to a housing after the surface light-emitting element array is mounted on a long printed board and is aligned to the rod lens array. Typically, a focal length from the rod lens array of the exposure head is approximately several millimeters, and thus the rod lens array is placed in a position several millimeters away from the photosensitive drum.

In the vicinity of the photosensitive drum, process parts (an electrification device, a development device, and the like) other than the exposure head are placed close to each other. An increase in size of the exposure head necessitates an increase of the diameter of the photosensitive drum to keep an area where the exposure head is to be placed. Then, an increase of the diameter of the photosensitive drum causes a problem of an increase in size of an image forming apparatus as a whole. Thus, it is required to minimize the exposure head to reduce the size of the image forming apparatus. Such a printer using an exposure head, which uses the smaller number of components than that in a laser-scanning printer in which a polygon motor deflectively scans a laser beam, makes it easy to reduce the apparatus size and its associated cost.

On the other hand, in a configuration using an exposure head, because of inclusion of many light-emitting elements on an exposure-head side, the number of wires for driving signals for lighting up each light-emitting element is enormous. This causes a problem of an increase in size of a printed board. To solve this problem, Japanese Patent No. 5760586 has been proposed. Japanese Patent No. 5760586 describes a configuration in which a selection signal that selects a predetermined chip group from a plurality of light-emitting chips and a lighting control signal wired in common to the plurality of chips are provided and a chip selected by the selection signal can be lighted up. The configuration described in Japanese Patent No. 5760586, in which the lighting control signal can be used by the chips in common, can reduce the number of wires on the printed board.

According to the technique of the above-described Japanese Patent No. 5760586, it is possible to reduce the number of wires by using the configuration in which each predetermined array group is selected from arrays (arrays are selected on a group-by-group basis) to emit light. However, surface light-emitting elements are turned out when being not selected, and thus a quantity of emitted light of the exposure head is reduced. The reduction in an amount of emitted light of the exposure head may cause a problem of being short of a light quantity relative to a light quantity necessary for formation of a latent image on a photosensitive drum. In a case of increasing the speed of the image forming apparatus in particular, the exposure head is required to emit a larger quantity of light, and the technique of Japanese Patent No. 5760586 suffers from a shortage of light quantity.

Further, in a case where the width along a widthwise direction vertical to the longitudinal direction of a printed board on which surface light-emitting elements arrays is mounted is reduced, the printed board becomes more likely to deform due to heat applied during solder mounting of components on the printed board. In particular, if wires or mounted components on the printed board are placed in unbalanced manner, heat conduction and heat capacity characteristics on the board are unbalanced, which easily deforms the printed board.

SUMMARY OF THE INVENTION

According to a typical configuration of the present invention, an exposure head that exposes a photosensitive member to light, includes: a first board that is a long board; a plurality of light-emitting element array chips that are mounted on one surface of the first board and arranged along a longitudinal direction of the first board; a connector mounted on the other surface opposite to the one surface of the first board, the connector being configured to make connection to an image processing IC mounted on a second board different from the first board; a first driver IC mounted on the other surface opposite to the one surface of the first board, the first driver IC being arranged on one side of the first board with respect to the connector in the longitudinal direction of the first board, the first driver IC being connected to the connector and being configured to drive the light-emitting element array chips; and a second driver IC mounted on the other surface opposite to the one surface of the first board, the second driver IC being arranged on the other side of the first board with respect to the connector in the lengthwise direction of the first board, the second driver IC being connected to the connector and being configured to drive the light-emitting element array chips, wherein the first driver IC, the second driver IC, and the connector are mounted on the first board in an area that overlaps an area where the plurality of light-emitting element array chips are mounted, along a vertical direction vertical to the surfaces of the first board, the first driver IC drives a device group including a plurality of light-emitting element array chips arranged on a side where the first driver IC is placed with respect to a center of the first board in the longitudinal direction of the first board among the plurality of light-emitting element array chips arranged along the longitudinal direction, and the second driver IC drives a device group including a plurality of light-emitting element array chips arranged on a side where the second driver IC is placed with respect to the center of the first board in the longitudinal direction of the first board among the plurality of light-emitting element array chips arranged along the longitudinal direction.

Further features of the present invention will become apparent from the following description of exemplary embodiments with reference to the attached drawings.

BRIEF DESCRIPTION OF THE DRAWINGS

FIG. 7 is a view illustrating a wiring pattern in a fourth layer of the printed board according to the first embodiment.

FIG. 8 is a view illustrating a wiring pattern in a third layer of the printed board according to the first embodiment.

FIG. 14 is a view illustrating waveforms of driving signals.

DESCRIPTION OF THE EMBODIMENTS

Hereinafter, preferred embodiments of the present invention will be illustratively described in detail with reference to accompanying drawings. Note that dimensions, materials, shapes, and relative positions of composing elements described in the following embodiments should be appropriately changed depending on the configuration of an apparatus to which the present invention is applied and various conditions. Thus, the following description is not description to the effect of limiting the scope of the present invention thereto unless the context specifically indicates otherwise.

[First Embodiment]

(Configuration of the Whole of Image Forming Apparatus)

Figure 1:
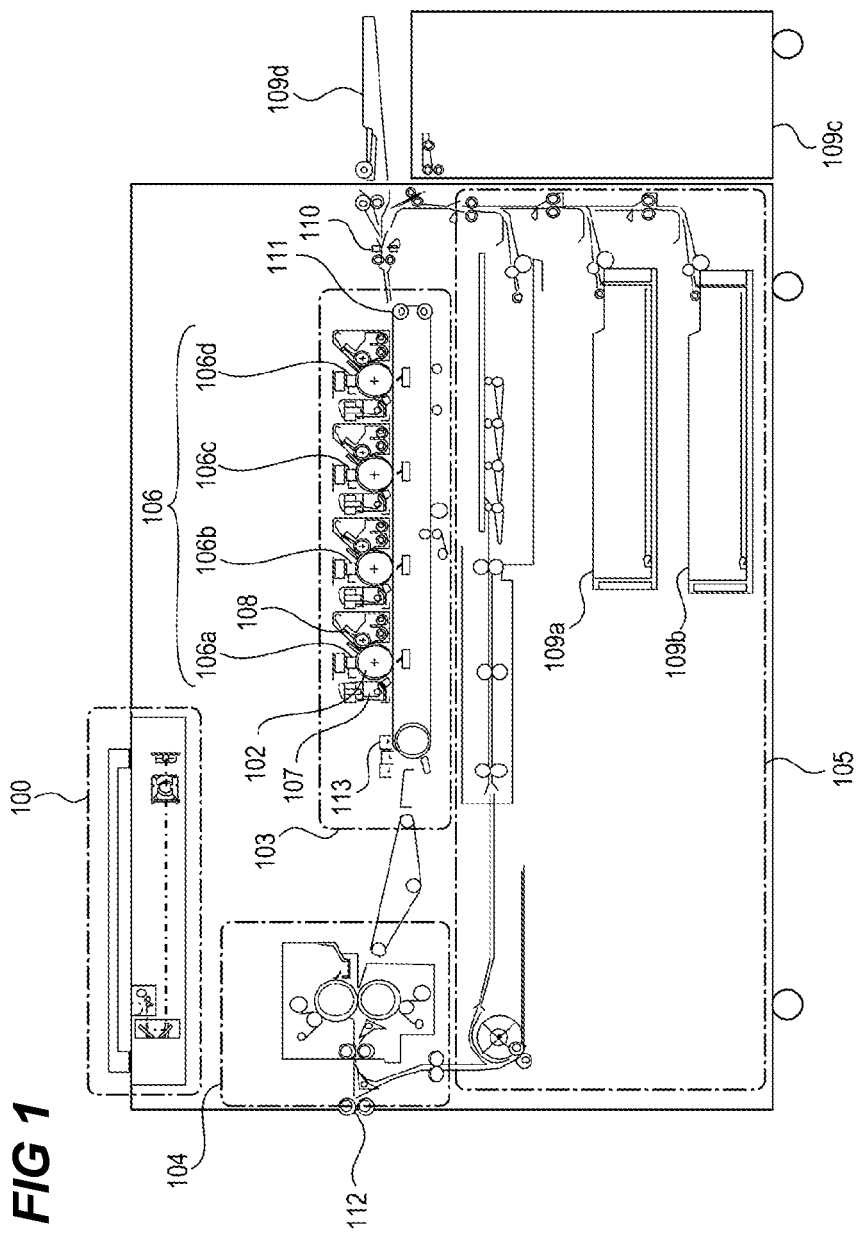
FIG. 1 is a schematic sectional view illustrating an overall configuration of an image forming apparatus.

With reference to FIG. 1, an electrophotographic image forming apparatus according to the present embodiment will be briefly described. FIG. 1 illustrates the configuration of the whole of the image forming apparatus. The image forming apparatus includes a scanner unit 100, an image forming unit 103, a fixing portion 104, a feeding/conveying unit 105, and a printer controller (not illustrated) that controls the foregoing components.

The scanner unit 100 illuminates an original put on an original platen glass to optically read out an original image, and then converts the image into an electric signal to form image data. In the image forming unit 103, a photosensitive drum 102 serving as an image bearing member (photosensitive member) is rotated to be electrified by an electrification device 107. An exposure head 106 emits light according to the image data and collects light emitted from chip surfaces of LEDs arranged in an array (light-emitting element array) onto the photosensitive drum 102 using a rod lens array, to form an electrostatic latent image on the photosensitive drum 102. A development device 108 develops the electrostatic latent image formed on the photosensitive drum 102 with toner. A developed toner image is implemented by inclusion of four sets of development units (development stations) for a series of electrophotographic processes in which the toner image is transferred onto a paper sheet conveyed to a transfer belt 111. The four sets of development units that are arranged in an order of cyan (C), magenta (M), yellow (Y), and black (K) sequentially perform image forming operations for magenta, yellow, and black after a predetermined time elapses from a start of an image forming operation in a cyan station. The feeding/conveying unit 105 feeds a paper sheet as a recording medium from a previously-specified feeding unit among built-in feeding units 109a and 109b, an external feeding unit 109c, and a manual feeding unit 109d. The fed paper sheet is conveyed to a registration roller 110. The registration roller 110 conveys the paper sheet onto the transfer belt 111 at the time when the toner image formed by the above-described image forming unit 103 is transferred onto the paper sheet. An optical sensor 113, which is placed in a position opposite to the transfer belt 111, detects the position of a test chart printed on the transfer belt 111 in order to derive an amount of color shift between the respective stations. An image processing IC 401 (refer to FIG. 4) is notified of the amount of color shift derived in the optical sensor 113, and an image position of each color is corrected. This control allows a full-color toner image free from color shift to be transferred onto the paper sheet. The fixing portion 104, which is formed of a combination of rollers and includes therein a heat source such as a halogen heater, melts and fixes the toner on the paper sheet onto which the toner image has been transferred from the transfer belt 111, using heat and pressure. The paper sheet having an image fixed thereto is discharged to the outside of the image forming apparatus by a discharge roller 112.

The printer controller communicates with an MFP controller that controls the whole of an MFP (the whole of the image forming apparatus) and exercises control according to instructions given from the MFP controller. Further, the printer controller gives instructions for enabling smooth and well-balanced operations as a whole while managing the states of the above-described units for scanning, image formation, fixing and feeding/conveying. Note that an MFP is an abbreviation of a multifunction printer and the whole of an MFP means the whole of the image forming apparatus. A multifunction printer equipped with functions of a printer, a copying machine, an image reader, and a facsimile is described here as an example of the image forming apparatus.

(Configuration of Exposure Head)

Figure 2A:
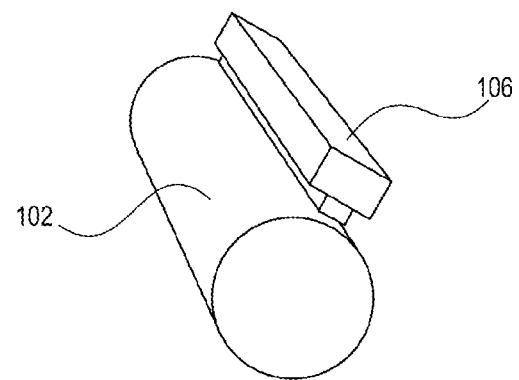
FIGS. 2A and 2B are views illustrating a positional relationship between an exposure head and a photosensitive drum.
Figure 2B:
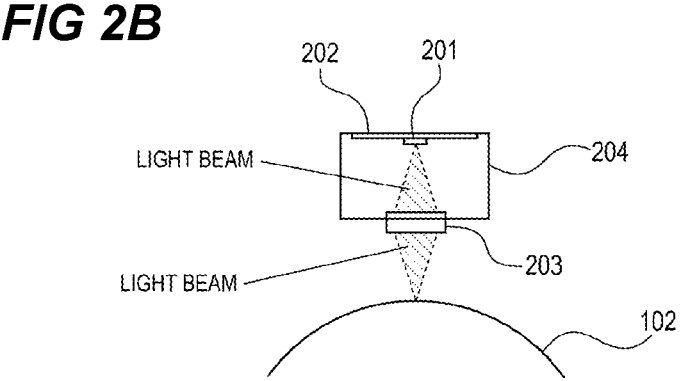

With reference to FIG. 2A and 2B, the exposure head 106 that exposes the photosensitive drum 102 to light will be described. FIGS. 2A and 2B illustrate the manner in which the exposure head 106 is placed relative to the photosensitive drum 102 and the manner in which light emitted from a surface light-emitting element array is collected on the photosensitive drum 102. The exposure head 106 and the photosensitive drum 102 are attached to the image forming apparatus by attaching members not illustrated, respectively. The exposure head 106 includes a surface light-emitting element array device group 201 formed of a plurality of surface light-emitting element array chips, a printed board (one example of a first board) 202 on which the surface light-emitting element array device group 201 is mounted, a rod lens array 203, and a housing 204 to which the rod lens array 203 and the printed board 202 are attached. The printed board 202 is a long electric board. The exposure head 106 is assembled and adjusted solely in a factory, where also focus adjustment and light-quantity adjustment of each spot are performed. The photosensitive drum 102, the rod lens array 203, and the surface light-emitting element array device group 201 are placed such that each of a distance between the photosensitive drum 102 and the rod lens array 203 and a distance between the rod lens array 203 and the surface light-emitting element array device group 201 has a predetermined length. Because of such placement, light (light beam) emitted from the surface light-emitting element array is imaged onto the photosensitive drum 102. Thus, in focus adjustment, a position where the rod lens array 203 is to be attached is adjusted such that a distance between the rod lens array 203 and the surface light-emitting element array device group 201 has a desired length. Further, in light-quantity adjustment, the surface light-emitting element array chips are sequentially caused to emit light, and a driving current of each light-emitting element is adjusted such that a predetermined quantity of light is collected through the rod lens array 203.

(Configuration of Printed Board)

Figure 3A:
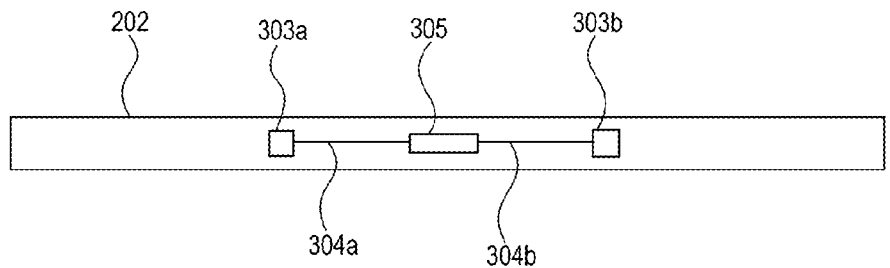
FIGS. 3A, 3B, and 3C are explanatory views of a printed board on which a surface light-emitting element array is mounted.
Figure 3B:
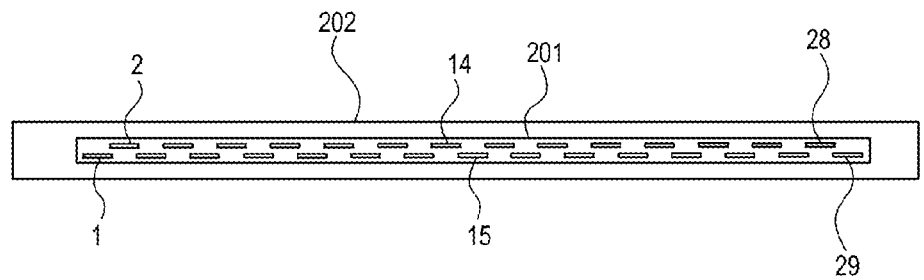

FIGS. 3A and 3B illustrate the printed board 202 in which the surface light-emitting element array device group 201 is arranged. The surface light-emitting element array device group 201 is mounted on one surface in the printed board 202, and FIG. 3A illustrates the other surface (hereinafter referred to as a surface light-emitting element array non-mounting surface) opposite to the one surface. FIG. 3B illustrates the one surface (hereinafter referred to as a surface light-emitting element array mounting surface) on which the surface light-emitting element array device group 201 is mounted in the printed board 202.

The printed board 202 is a board in which components can be mounted on both surfaces of a non-mounting surface illustrated in FIG. 3A and a mounting surface illustrated in FIG. 3B opposite to the non-mounting surface. As illustrated in FIG. 3A, on the non-mounting surface of the printed board 202, a connector 305 for making connection to the image processing IC 401 mounted on a controller board (second board) 415 (refer to FIG. 4) in an apparatus different from the apparatus including the printed board 202 is mounted. Further on the non-mounting surface of the printed board 202, a plurality of driver ICs 303a and 303b for driving the surface light-emitting element array device group 201 are mounted. Here, the driver IC 303a is one example of a first driver IC and the driver IC 303b is one example of a second driver IC. As illustrated in FIG. 3B, on the mounting surface of the printed board 202, the surface light-emitting element array device group 201 formed of a plurality of surface light-emitting element array chips is mounted. Additionally, as will be described later, the printed board 202 is a four-layer board including a first layer, a second layer, a third layer, and a fourth layer that are stacked in the stated order. In the four-layer printed board 202, the connector 305 and the driver ICs 303a and 303b are mounted in the fourth layer and the surface light-emitting element array device group 201 is mounted in the first layer.

As illustrated in FIG. 3B, on the surface light-emitting element array mounting surface of the printed board 202, the surface light-emitting element array device group 201 formed of a plurality of surface light-emitting element array chips is mounted. The surface light-emitting element array device group 201 has a configuration in which 29 surface light-emitting element array chips 1 to 29 are arranged along the longitudinal direction of the printed board 202 so as to form a staggered pattern. In each of the surface light-emitting element array chips, 516 surface light-emitting element array devices serving as light-emitting points are arranged along the longitudinal direction of a chip with pitches corresponding to a predetermined resolution. In this embodiment, a pitch of the surface light-emitting element array devices is approximately 21.16 μm corresponding to a resolution of 1200 dpi, and a distance between one end and the other end of the 516 light-emitting points in a chip is approximately 10.9 mm. The surface light-emitting element array device group 201, in which the 29 surface light-emitting element array chips are arranged along the longitudinal direction, includes 14964 exposable light-emitting elements. This enables formation of an image having an image width of approximately 316 mm along the longitudinal direction. The surface light-emitting element array chips 1 to 29 are arranged in two rows so as to form a staggered pattern, and each row is placed so as to extend along the longitudinal direction of the printed board 202.

Figure 3C:
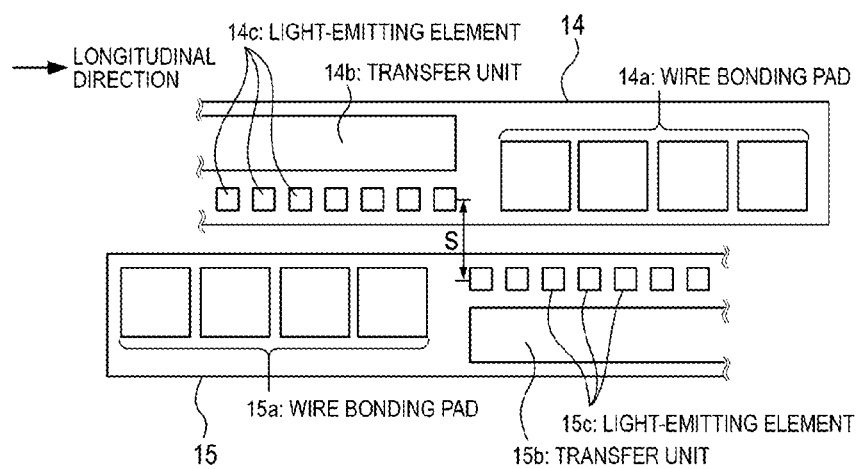

FIG. 3C illustrates a state of a boundary between surface light-emitting element array chips. FIG. 3C illustrates a boundary between the surface light-emitting element array chips 14 and 15 as an example. Wire bonding pads 14a and 15a for receiving control signals are placed in ends of longitudinal direction of the chips, respectively. In the respective chips, transfer units 14b and 15b and light-emitting elements 14c and 15c are driven by control signals received at the wire bonding pads 14a and 15a. The pitch of longitudinal direction of light-emitting elements in a boundary between chips is also approximately 21.16 μm corresponding to a resolution of 1200 dpi. Meanwhile, the chips are arranged such that a distance (S in FIG. 3C) between respective light-emitting points of chips in the two rows is approximately 84 μm (corresponding to four pixels at 1200 dpi or corresponding to eight pixels at 2400 dpi). Each row is placed so as to extend along the longitudinal direction of the printed board 202, and the rows are placed such that an interval therebetween is approximately 84 µm (corresponding to four pixels at 1200 dpi or corresponding to eight pixels at 2400 dpi).

As illustrated in FIG. 3A, on the surface light-emitting element array non-mounting surface of the printed board 202, the plurality of driver ICs for driving the plurality of surface light-emitting element array chips arranged on the mounting surface of the printed board 202 are mounted. FIG. 3A illustrates two driver ICs 303a and 303b as an example of the plurality of driver ICs. The two driver ICs 303a and 303b are placed on opposite sides of the connector 305 serving as a connecting unit, along the longitudinal direction of the printed board 202.

The driver IC 303a is placed on one side of the printed board 202 with respect to the connector 305 in the longitudinal direction of the printed board 202. The driver IC 303a drives a device group including a plurality of surface light-emitting element array chips 1 to 15 arranged from the center of the longitudinal direction of the printed board 202 to one side of the longitudinal direction of the printed board 202, among the plurality of surface light-emitting element array chips 1 to 29 arranged along the longitudinal direction of the printed board 202. In other words, the driver IC 303a drives a device group including the plurality of light-emitting element array chips 1 to 15 arranged on a side where the driver IC 303a is placed with respect to the center of the printed board 202 in the longitudinal direction of the printed board 202, among the plurality of surface light-emitting element array chips 1 to 29 arranged along the longitudinal direction of the printed board 202.

The driver IC 303b is placed on the other side of the printed board 303 with respect to the connector 303 in the longitudinal direction of the printed board 202. The driver IC 303b drives a device group including a plurality of surface light-emitting element array chips 16 to 29 arranged from the center of the longitudinal direction of the printed board 202 to the other side of the longitudinal direction of the printed board 202, among the plurality of surface light-emitting element array chips 1 to 29 arranged in the longitudinal direction of the printed board 202. In other words, the driver IC 303b drives a device group including a plurality of light-emitting element array chips 16 to 29 arranged on a side where the driver IC 303b is placed with respect to the center of the printed board 202 in the longitudinal direction of the printed board 202, among the plurality of surface light-emitting element array chips 1 to 29 arranged along the longitudinal direction of the printed board 202.

The connector 305 is placed in the center (central position) of the longitudinal direction of the printed board 202 and is mounted on the array non-mounting surface of the printed board 202. The connector 305 is a connecting unit for making connection to the image processing IC 401 (refer to FIG. 4) mounted on the controller board 415 in an apparatus different from the apparatus including the printed board 202. More specifically, the connector 305 is connected to a control signal line (not illustrated) that extends from the image processing IC 401 (refer to FIG. 4) and controls the driver ICs 303a and 303b through a cable, is connected to a power-supply/ground line (not illustrated), and is connected to the drive ICs 303a and 303b. The connector 305 is connected to the driver IC 303a on the one side of the longitudinal direction through a control signal line 304a and is connected to the driver IC 303b on the other side of the longitudinal direction through a control signal line 304b on the array non-mounting surface of the printed board 202. Wires (driving signal lines) for driving surface light-emitting element array chips extend from the driver ICs 303a and 303b, pass through the internal layers of the printed board 202, and are connected to the surface light-emitting element array chips 1 to 15 and the surface light-emitting element array chips 16 to 29, respectively.

As described above, each of the drivers ICs 303a and 303b and the connector 305 is mounted on the printed board 202 in an area where a part thereof overlaps an area where the surface light-emitting element array chips 1 to 29 are mounted along a vertical direction vertical to the surfaces of the printed board 202.

Figure 5:
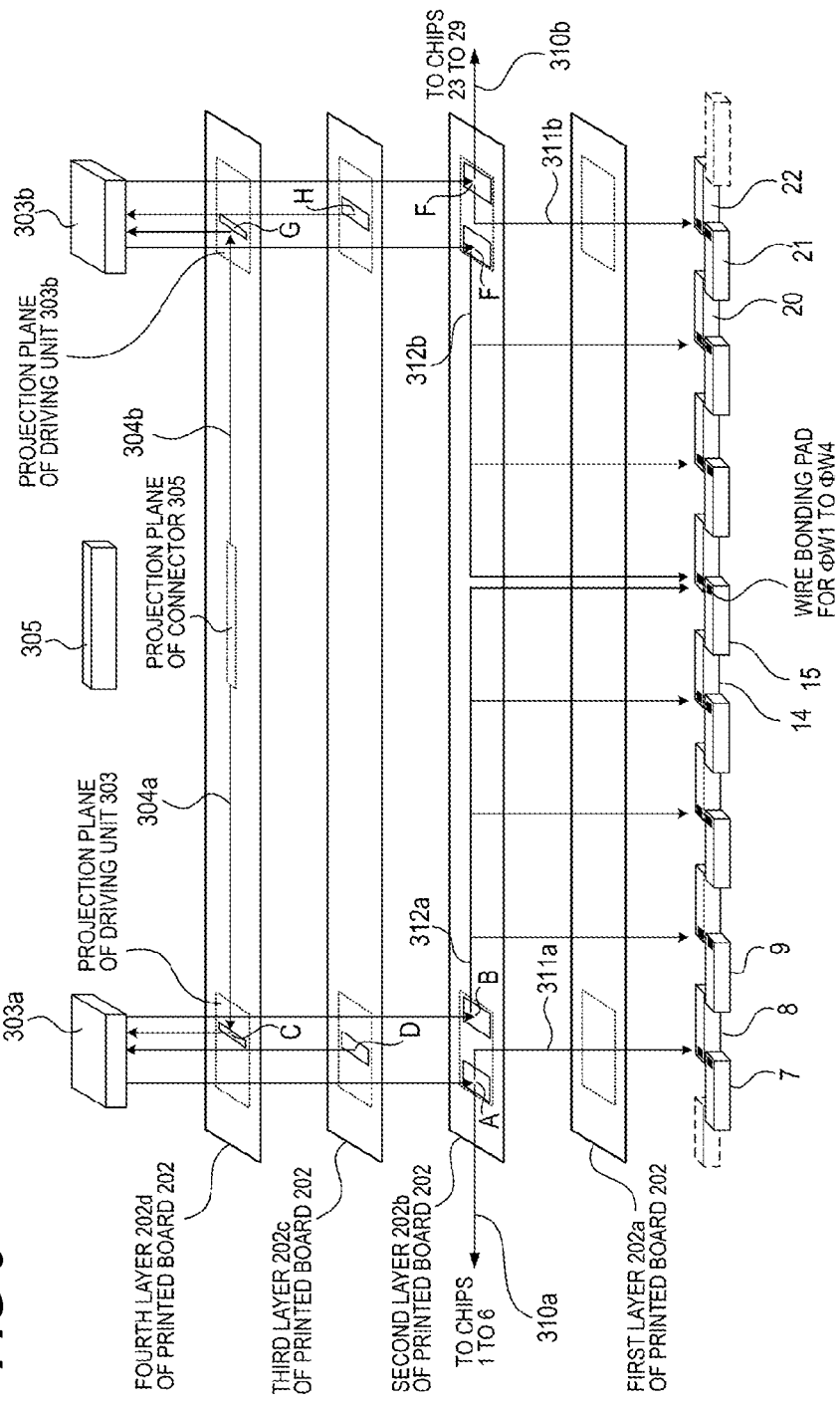
FIG. 5 is a view illustrating positions of mounted components and wires between the components in a printed board according to a first embodiment.

FIG. 5 illustrates respective positions where the mounted components (the surface light-emitting element array chips 1 to 29, the driver ICs 303a and 303b, and the connector 305) are mounted in the printed board 202, and wires between the components. Further, FIG. 5 illustrates a part of the printed board 202 along the longitudinal direction, and more specifically illustrates a range covering the chips 7 to 22 among the surface light-emitting element array chips 1 to 29. Moreover, FIG. 5 illustrates wires by conceptual drawing whereby the mounted components and respective layers (four layers here) of the printed board are separated, for easier understanding of wires in respective portions. Actually, in the printed board, the respective mounted components and the respective layers of the printed board are adhered to each other to form a single printed board. The four-layer printed board 202 includes a first layer 202a where the surface light-emitting element array chips are mounted, a second layer 202b where driving signal lines for the surface light-emitting element array chips are mainly wired, a third layer 202c where patterns of a power supply and a ground are wired, and a fourth layer 202d where the driver ICs 303a and 303b and the connector 305 are mounted, that are sequentially arranged in the stated order, starting from a side where the surface light-emitting element array chips are placed (a photosensitive-drum side) in FIG. 5. The surface light-emitting element array chips mounted in the first layer 202a of the printed board 202 are 29 chips that are arranged in two rows along the longitudinal direction of the printed board 202 so as to form a staggered pattern. The connector 305 is mounted in the fourth layer 202d of the printed board 202 in which the driver ICs 303a and 303b are mounted, and is placed in an approximate center (central portion) of the longitudinal direction of the printed board 202. Meanwhile, also a chip (the surface light-emitting element array chip 15 here) in the center of the longitudinal direction among the 29 surface light-emitting element array chips arranged in a staggered pattern on the surface opposite to the surface on which the driver ICs 303a and 303b and the connector 305 are mounted is placed in the approximate center (central portion) of the longitudinal direction of the printed board 202.

Figure 6A:
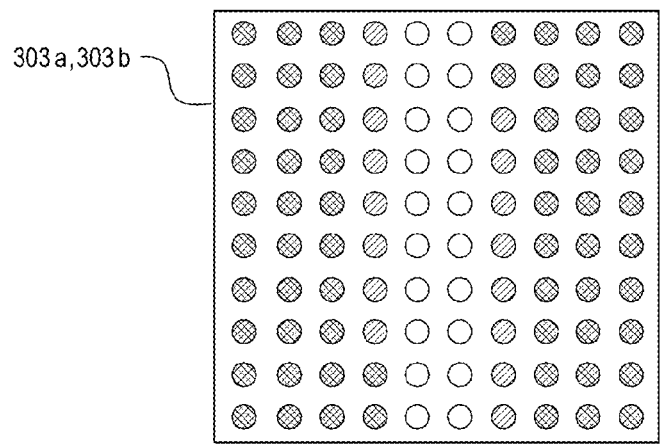
FIG. 6A is a view illustrating a layout of input and output terminals of a driving unit according to the first embodiment.

With reference to FIG. 6A, a layout of input and output terminals of the driver ICs 303a and 303b will be described. FIG. 6A illustrates a layout of input and output terminals of each of the driver ICs 303a and 303b. Note that the drivers ICs 303a and 303b are components of the same kind and packages of ball grid arrays (BGA). The input and output terminals of the driver IC 303a or 303b are 100 terminals (10 terminals long by 10 terminals wide) arranged in a matrix (in a grid) at predetermined intervals (pitches of 0.6 mm). ΦW1 to ΦW4 terminals 306 are output terminals at which driving signals ΦW1 to ΦW4 to be transmitted from the driver ICs 303a and 303b to each of the surface light-emitting element array chips 1 to 29 are output. The ΦW1 to ΦW4 terminals 306 are allocated to terminals in both ends in each of the driver ICs 303a and 303b in the longitudinal direction of the printed board 202, among the terminals arranged in a matrix. At the ΦW1 to ΦW4 terminals 306, the driving signals ΦW1 to ΦW4 for driving the surface light-emitting element array chips independently of each other are output. Here, output terminals for eight chips in which every four output terminals are used to output the driving signals ΦW1 to ΦW4 for one chip (i.e., 32 output terminals) are allocated to each of both ends of each of the driver ICs 303a and 303b. Each of the driver ICs 303a and 303b has a function of selecting a terminal to be used (a terminal selection circuit), and has a selection circuit that can select any terminals in units of terminals in each surface light-emitting element array chip (in units of four terminals here) from a range where the ΦW1 to ΦW4 terminals are allocated. Inside the ΦW1 to ΦW4 terminals 306, there are placed terminals 307a and 307b that cope with a signal (an image controller signal) received from the image processing IC 401 (refer to FIGS. 4) and Φ1-, Φ2-, and Φs-signals for controlling shifting of the surface light-emitting element array chips. Note that the Φ1-, Φ2-, and Φs-signals are signals transmitted to the surface light-emitting element array chips in common. Each of the driver ICs 303a and 303b has a selection circuit that can select also any of the input terminals 307a that cope with an image controller signal and the terminals 307b that cope with the Φ1-, Φ2-, and Φs-signals from a range of allocation. The innermost range of the input and output terminals of the driver IC 303a or 303b, a power-supply/ground terminal 308 is placed.

Figure 6B:
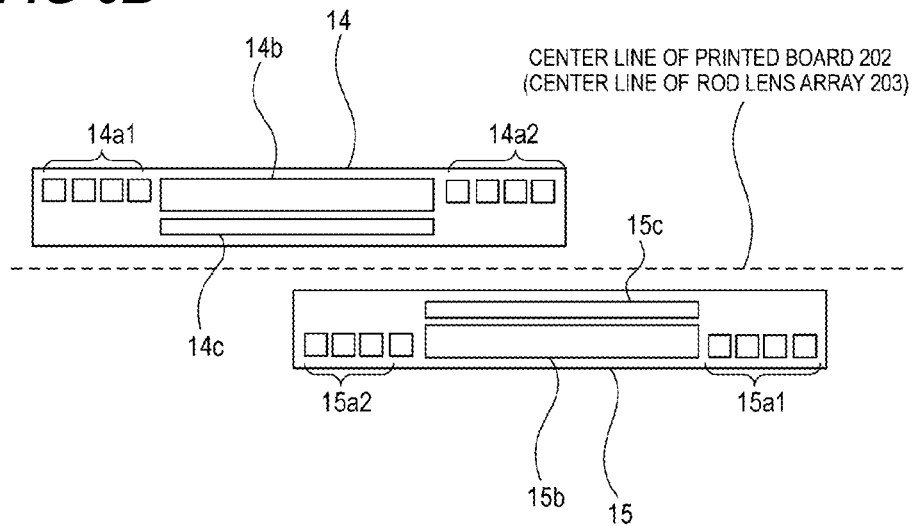
FIG. 6B is a view of an outside shape of a surface light-emitting element array chip according to the first embodiment.

FIG. 6B illustrates outside shapes of the surface light-emitting element array chips by conceptual drawing. FIG. 6B illustrates the surface light-emitting element array chips 14 and 15 among the surface light-emitting element array chips 1 to 29, as an example. In the ends of the longitudinal direction of the light-emitting element array chips 14 and 15, wire bonding pads for making connection to the driver IC and the power supply are placed. In FIG. 6B, a wire bonding pad 15a2 for Φ1, Φ2, Φs and VGA is placed in the left end and a wire bonding pad 15a1 for ΦW1 to ΦW4 is placed in the right end in the surface light-emitting element array chip 15. A light-emitting thyristor (a plurality of light-emitting elements) 15c is placed in the upper end and the transfer unit 15b for shifting is placed in the lower end in the surface light-emitting element array chip 15. Meanwhile, a wire bonding pad 14a1 for ΦW1 to ΦW4 is placed in the left end and a wire bonding pad 14a2 for Φ1, Φ2, Φs and VGA is placed in the right end in the surface light-emitting element array chip 14. The transfer unit 14b for shifting is placed in the upper end and a light-emitting thyristor (many light-emitting elements) 14c is placed in the lower end in the surface light-emitting element array chip 14. Additionally, operations of the respective units in a surface light-emitting element array chip and the input signals will be described in detail later. As described above, the surface light-emitting element array chips are arranged in two rows along the longitudinal direction of the board so as to form a staggered pattern. A light-emitting point (a light-emitting thyristor) of each chip is preferably placed in a position as close as possible to the lens center of the rod lens array 203. Thus, a direction in which the surface light-emitting element array chips are mounted is set to allow the light-emitting thyristor to be placed on a side close to a center line (dotted line in FIG. 6B) of the rod lens array 203 that is projected onto the printed board. Further, in order to uniformize a heat distribution in the printed board, the positional relationship between the printed board 202 and the rod lens array 203 is set to allow the center along a widthwise direction vertical to the longitudinal direction of the printed board 202, to be located on the center line of the rod lens array 203.

Next, with reference to FIGS. 7 to 11, wiring in each layer of the printed board 202 will be described in detail. FIGS. 7 to 11 illustrate wiring patterns in the layers on a side where the driver IC 303a is provided. Though not illustrated, wiring patterns in the layers on a side where the driver IC 303b is provided are also formed so that the wiring patterns on both the sides are substantially symmetric with respect to the connector except that chips to be driven by the driver IC 303b are fewer than chips to be driven by the driver 303a by one.

FIG. 7 illustrates a wiring pattern in the fourth layer 202d of the printed board 202. In the fourth layer 202d of the printed board 202, the driver ICs 303a and the 303b are placed at the substantially same distance from the connector 305 along the longitudinal direction of the board. More specifically, the driver ICs 303a and 303b are placed symmetrically with respect to the connector 305 along the longitudinal direction of the board. FIG. 7 illustrates a part of a wiring pattern between the connector 305 and the driver IC 303a. Additionally, though not illustrated, also a wiring pattern between the connector 305 and the driver IC 303b, which is similar to the wiring pattern between the connector 305 and the driver IC 303a, is provided so as to establish a symmetrical positional relationship with the wiring pattern between the connector 305 and the driver IC 303a. Control signal lines 1501 to 1508 extending from the image processing IC start from signal-line terminals of the connector 305, are wired in the fourth layer 202d of the printed board 202 through no via, and then are wired to input signal pins (denoted by C and G in FIG. 5) corresponding to respective input terminals of the driver ICs 303a and 303b. The control signal lines extending from the image processing IC are signal lines for low voltage differential signaling (LVDS) and include signal lines 1501, 1502, 1503, 1504, 1505, 1506, 1507, and 1508 for a clock and three types of data for each of the driver IC 303a and 303b (LVDS, four pairs and so eight lines in total). The control signal lines 1501 to 1508 extending from the image processing IC 401 (refer to FIG. 4) are wired to input terminals on a side closer to the connector 305 in the driver IC 303a. Likewise, in the fourth layer 202d, the signal lines 1509, 1510, and 1511 are wired to the terminals for Φ1-, Φ2-, and Φs-signals in the driver IC 303a.

Figure 11:
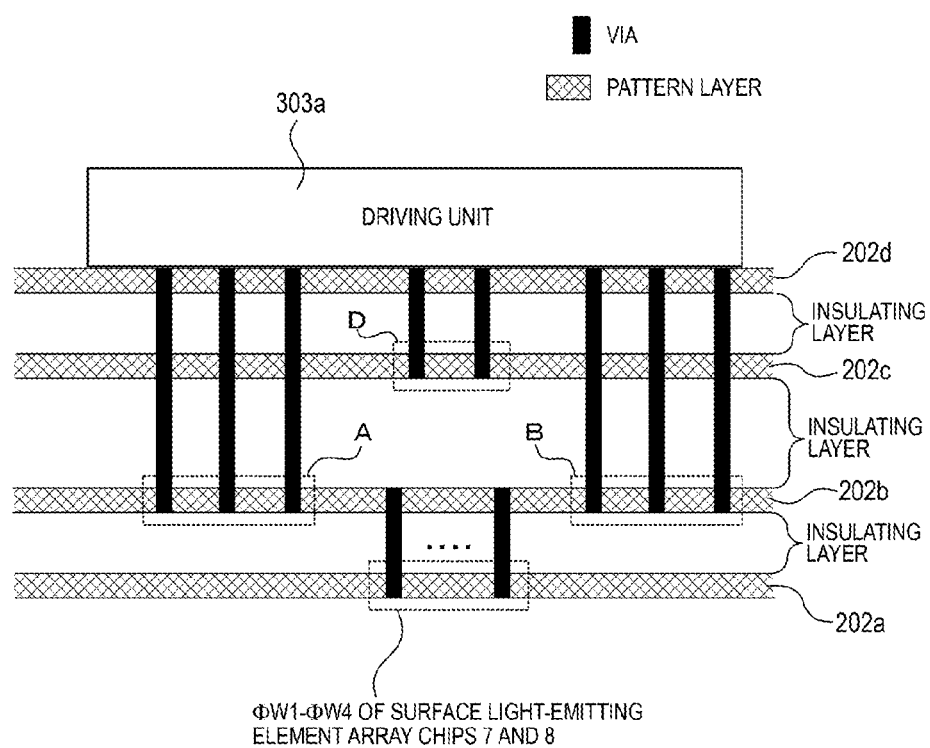
FIG. 11 is a sectional view of the printed board.

FIG. 8 illustrates a wiring pattern in the third layer 202c of the printed board 202. In the third layer 202c of the printed board 202, power-supply patterns 1512 and 1514 that are wiring patterns for a power supply and a ground pattern 1513 that is a wiring pattern for a ground are wired. The power-supply patterns 1512 and 1514 and the ground pattern 1513 are wired to signal pins (denoted by D and H in FIG. 5) corresponding to the power-supply/ground terminals of the driver ICs 303a and 303b in the third layer 202c. The power-supply/ground terminals 308 of the driver IC 303a or 303b illustrated in FIG. 6A are connected from the fourth layer 202d in which the driver ICs 303a and 303b are mounted to the third layer 202c through vias as illustrated in FIG. 11. In the third layer 202c, the ground pattern 1513 is placed between the signal lines 1501 to 1508 (FIG. 7) extending from the image processing IC in the fourth layer and driving signal lines 310a, 311a, and 312a (FIG. 9) of surface light-emitting element array chips in the second layer described later. As a result of this, even in a case where a noise is applied to a signal provided from the image processing IC, from outside the exposure head 106, the driving signal lines of the surface light-emitting element array chips can block the noise because of the presence of the ground pattern 1513. Thus, the surface light-emitting element array chips can emit light stably. Additionally, in the printed board 202 manufactured by a build-up process, the vias leading to the power-supply/ground terminals of the driver ICs 303a and 303b in the third layer 202c connect the fourth layer 202d and the third layer 202c as illustrated in FIG. 11, but the vias leading to the third layer 202c does not penetrate to the second layer 202b. To use a through via would interrupt the wiring pattern extending from the first layer to the second layer. The employment of the configuration with vias that do not penetrate all the layers can increase the flexibility of wiring patterns in the second layer and the first layer.

Figure 9:
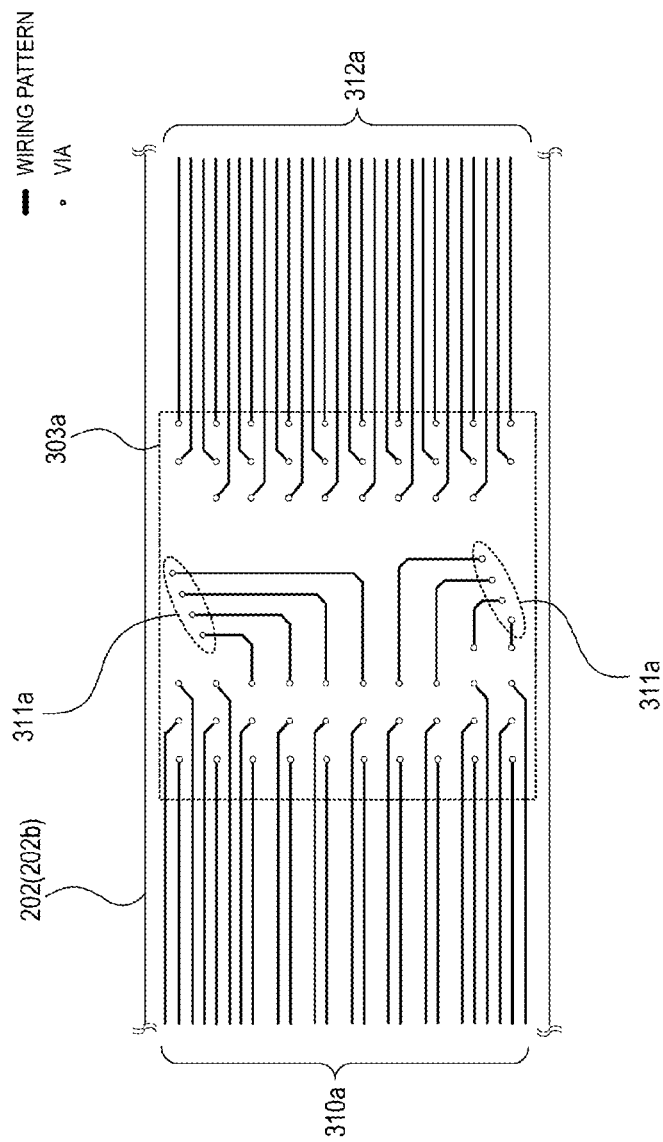
FIG. 9 is a view illustrating a wiring pattern in a second layer of the printed board according to the first embodiment.

FIG. 9 illustrates a wiring pattern in the second layer 202b of the printed board 202. In the second layer 202b of the printed board 202, the driving signal lines 310a, 311a, and 312a for the surface light-emitting element array chips are wired. The driving signal lines 310a, 311a, and 312a for the chips are wired from signal pins (denoted by A, B, E, and F in FIG. 5) corresponding to the ΦW1 to ΦW4 terminals of the driver IC 303a, to the chips. The ΦW1 to ΦW4 terminals 306 of the driver IC 303a or 303b illustrated in FIG. 6A in the fourth layer 202d on which the driver ICs 303a and 303b are mounted are wired to the second layer 202b through vias as illustrated in FIG. 11. In the second layer 202b, as illustrated in FIG. 9, driving signal lines are wired from the signal pins (denoted by A, B, E, and F in FIG. 5) corresponding to the ΦW1 to ΦW4 terminals of the driver ICs 303a and 303b.

More specifically, in the second layer 202b, 24 driving signal lines 310a connected to the surface light-emitting element array chips 1 to 6 are wired from signal pins in one end area (denoted by A) of the driver IC 303a toward the end of the longitudinal direction of the printed board. Further, 28 driving signal lines 312a connected to the surface light-emitting element array chips 9 to 15 are wired from signal pins in the other end area (denoted by B) of the driver IC 303a toward the inside portion of the longitudinal direction of the printed board. Among driving signal lines extending from the signal pins in the one end area (denoted by A), eight driving signal lines 311a connected to the surface light-emitting element array chips 7 and 8 are wired from the one end area (denoted by A) toward the inside portion of the longitudinal direction of the printed board (toward the connector) in a vacant space between the one end area (denoted by A) and the other end area (denoted by B).

Additionally, as illustrated in FIG. 5, also on a side where the driver IC 303b is provided, wires are laid in the same manner as those on a side where the driver IC 303a is provided such that the wires on both the sides are symmetrical with respect to the connector. More specifically, in the second layer, 28 driving signal lines 310b connected to the surface light-emitting element array chips 23 to 29 are wired from signal pins in one end area (denoted by F) of the driver IC 303b toward the end of the longitudinal direction of the printed board. Further, 20 driving signal lines 312b connected to the surface light-emitting element array chips 16 to 20 are wired from signal pins in the other end area (denoted by E) of the driver IC 303b toward the inside portion of the longitudinal direction of the printed board. Moreover, among driving signal lines extending from the one end area (denoted by F), eight driving signal lines 311b connected to the surface light-emitting element array chips 21 and 22 are wired from the one end area (denoted by F) toward the inside portion of the longitudinal direction of the printed board (toward the connector) in a vacant space between the one end area (denoted by F) and the other end area (denoted by E).

The driver IC 303a (303b) is placed at a position astride the two surface light-emitting element array chips 7 and 8 (21 and 22) in an approximate center of the longitudinal direction, among the surface light-emitting element array chips 1 to 15 (16 to 29) forming a device group mounted on the mounting surface of the printed board 202, along the longitudinal direction of the board, as illustrated in FIG. 9. As a result of this, wires can be laid to the terminals of the above-stated two surface light-emitting element array chips in a vacant space between the output terminals provided on one side (the chips 1 to 6) and on the other side (the chips 9 to 15) of the longitudinal direction in the second layer 202b of the printed board 202 as described above. This can reduce a space for wiring toward both sides of the longitudinal direction, thereby further reducing the width of the board.

Figure 10:
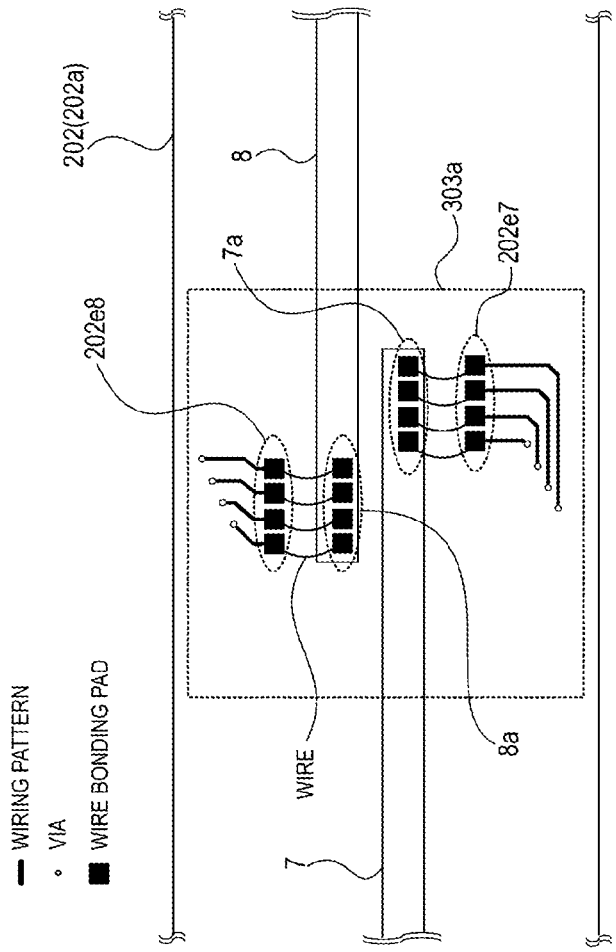
FIG. 10 is a view illustrating a wiring pattern in a first layer of the printed board according to the first embodiment.

FIG. 10 illustrates a part of a wiring pattern in the first layer 202a of the printed board 202. In the first layer 202a of the printed board 202, the surface light-emitting element array chips 1 to 29 are placed. FIG. 10 illustrates wiring patterns for the above-stated two surface light-emitting element array chips 7 and 8 astride which the driver IC 303a is placed in the first layer 202a, among the surface light-emitting element array chips 1 to 29, as examples. As illustrated in FIG. 10, in the first layer 202a, wire bonding pads 7a and 8a included in the surface light-emitting element array chips 7 and 8 and wire bonding pads 202e7 and 202e8 placed on the printed board 202 are connected by wire bonding. The driving signal lines extending from the signal pins corresponding to the ΦW1 to ΦW4 terminals for the surface light-emitting element array chips are wired in the second layer 202b as illustrated in FIG. 9 and are connected to the above-stated pads in places nearest to the respective surface light-emitting element array chips on the printed board in the first layer 202a through vias. Though not illustrated, signal lines extending from the signal pins corresponding to the Φ1-, Φ2-, and Φs-terminals for the surface light-emitting element array chips are connected to the first layer from the driver IC through vias, are wired in the first layer, and are connected to pads on the printed board, the pads corresponding to the surface light-emitting element array chips, respectively.

The above-described four-layer printed board 202 is manufactured by a build-up process that can establish via-connection selectively in a necessary portion, in order to increase the wiring flexibility of a signal pattern in the third layer having a high wiring density. FIG. 11 illustrates a section of the printed board 202. The printed board 202 is a board (glass epoxy board) including an insulating layer formed of glass fiber impregnated with epoxy resin and a pattern layer in which a copper-foil pattern is wired. A power-supply/ground layer (the third layer 202c) and a wiring layer (the second layer 202b) for signal lines from the ΦW1 to ΦW4 terminals are connected through vias extending from the fourth layer 202d on which the driver IC 303a is mounted. The vias do not penetrate to the first layer 202a. To use a through via would interrupt the wiring pattern in the first layer 202a. The employment of the configuration with the vias not penetrating all the layers can increase the wiring flexibility of wiring patterns. In the second layer 202b, the signal lines from the ΦW1 to ΦW4 terminals are wired and are connected to the first layer 202a through vias in the vicinity of the surface light-emitting element array corresponding to the signal lines, respectively.

By the wiring in the above-described manner, the signal lines from the ΦW1 to ΦW4 terminals to be wired in the second layer are wired so that 28 or fewer wires are connected toward an end or an inside portion of the printed board from each of the driver ICs 303a and 303b.

In other words, each of the two drivers ICs 303a and 303b as the plurality of driver ICs is placed in a position that allows a difference between the number of wires led out from each driver IC toward one side of the longitudinal direction in the printed board (toward an end of the board) and the number of wires led out toward the other side of the longitudinal direction (toward the center of the board, toward the connector) to be equal to or smaller than the number of wires for one surface light-emitting element array chip. More specifically, as illustrated in FIG. 9, the driver IC 303a (or the driver IC 303b) is placed in a position that allows a difference between 24 signal lines toward the chips 1 to 6 on the board-end side and 28 signal lines toward the connector side to be equal to or smaller than the number of wires for one chip (equal to or smaller than four here).

Additionally, in a case where a wiring pattern has a line width of 0.1 mm and a wire-to-wire clearance of 0.1 mm, a board is required to have a width of 5.5 mm at the smallest to accommodate a wiring pattern with 28 wires. In each of the driver ICs 303a and 303b, the pitch is 0.6 mm and the number of terminals arranged along the board width is ten as described above, and thus a dimension between both ends of the terminals in the driver IC is 5.4 mm. Actually, the dimension of 5.4 mm needs to be added with a predetermined width to allow for a size of a mounting pad provided on a printed-board side and a clearance in each end of the printed board. Nevertheless, adopting the above-described wiring paths can make the width of the printed board substantially equal to the width of the driver IC 303a or 303b. Further, placing the components symmetrically along the longitudinal direction of the printed board, which can reduce the number of wires on one hand, allows the printed board to be symmetrically affected by heat during solder mounting, thereby reducing deformation of the printed board. Moreover, when the temperature of the driver IC is increased during exposure by the exposure head, a heat distribution above the printed board can be uniformized. In the present embodiment, there has been described the configuration in which the surface light-emitting element array chips are arranged in two rows so as to form a staggered pattern, as an example. However, also in a configuration in which chips are arranged in one row, by placing driver ICs on opposite sides of a connector, it is possible to alleviate a local increase of wiring density and reduce the size of the board.

(Control Block)

Figure 4:
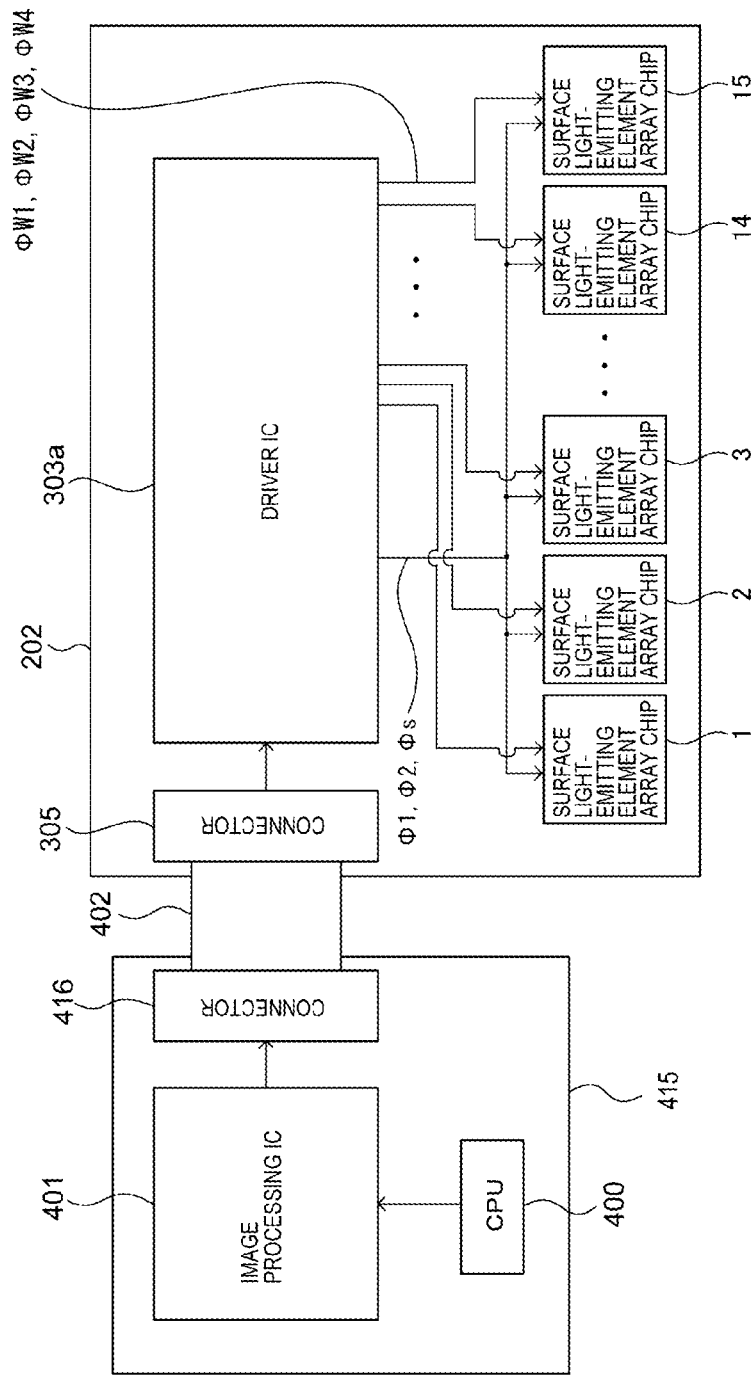
FIG. 4 is a control block diagram of an image controller and the exposure head.

FIG. 4 is a control block diagram including the controller board 415 on an apparatus side and the printed board 202 of the exposure head 106. While the surface light-emitting element array chips 1 to 15 and the driver IC 303a will be described in this example in FIG. 4, the surface light-emitting element array chips 16 to 29 and the driver IC 303b not illustrated operate in the same manner. Further, while processing of a single color will be described for the purpose of simplifying the description, the same processing of four colors is simultaneously performed in parallel. The image processing IC 401 mounted on the controller board 415 transmits a signal for controlling the exposure head 106 to the exposure head 106. The signal includes image data, a line synchronization signal, and a communication signal of a CPU 400, each of which is input to the connector 305 mounted on the printed board 202 on a side where the exposure head 106 is provided, from a connector 416 mounted on the controller board 415 on an apparatus side through a cable 402 that transmits a signal.

In the controller board 415, the CPU 400 serving as a controller controls processing on image data and processing on printing timing. The image processing IC 401 performs image processing on image data received from the scanner unit 100 or from outside of the image forming apparatus to generate driving data for driving the exposure head 106. The image processing IC 401 transmits the driving data to the driver IC 303a (303b) on the printed board 202 through the connector 416, the cable 402 (flexible flat cable (FFC), for example), and the connector 305. The driver IC 303a (303b) performs predetermined processing on the received driving data to generate driving signals ΦW1 to ΦW4 and control signals Φs, Φ1, and Φ2 to be supplied to each chip.

(Description of SLED Circuit)

Figure 12:
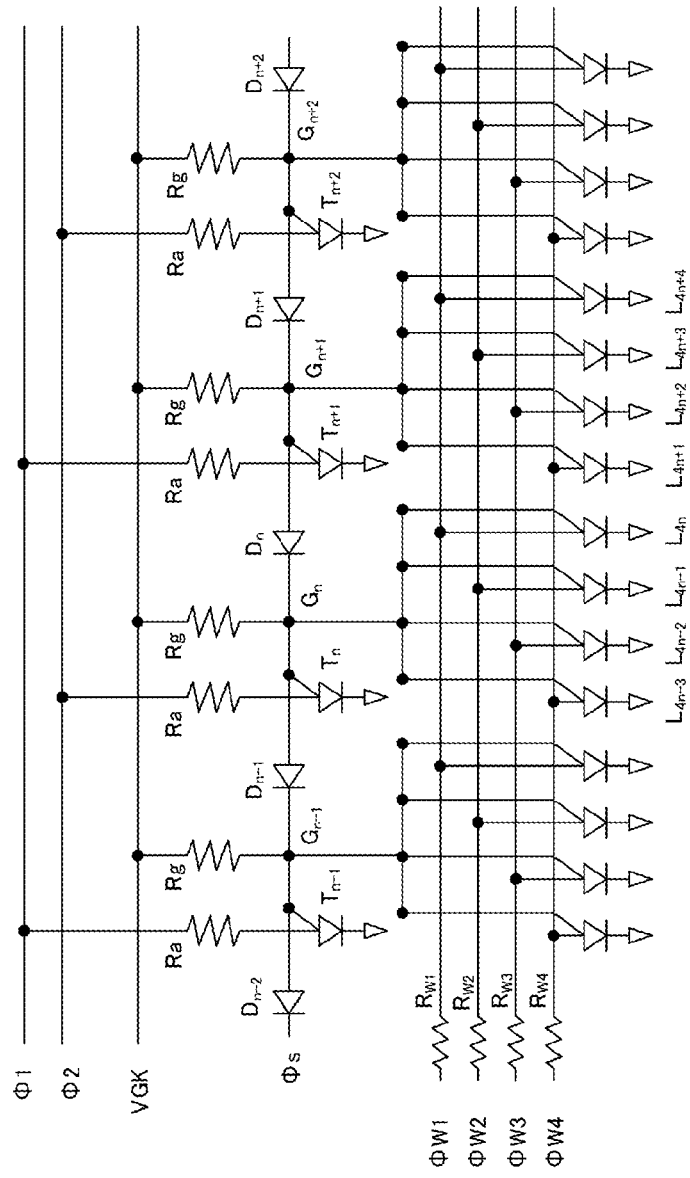
FIG. 12 is a diagram of an internal circuit of the surface light-emitting element array chip.

FIG. 12 illustrates an equivalent circuit of a part extracted from a self-scanning light-emitting element array in the present embodiment. In FIG. 12, Ra and Rg denote anode resistance and gate resistance, respectively, Tn denotes a shift thyristor, Dn denotes a transfer diode, and Ln denotes a light-emitting thyristor. Further, Gn denotes a common gate of a corresponding shift thyristor Tn and a light-emitting thyristor connected to the shift thyristor Tn. Here, n is defined as an integer equal to or larger than two. A line of Φ1 is a transfer line of odd-numbered shift thyristors, a line of Φ2 is a transfer line of even-numbered shift thyristors, and lines of ΦW1 to ΦW4 are lighting signal lines of the light-emitting thyristors and have resistance RW1 to RW4, respectively. A line of VGK is a gate line and a line of Φs is a start pulse line. As illustrated in FIG. 12, a single shift thyristor Tn is connected to four light-emitting thyristors L4n−3 to L4n, thereby forming a configuration in which four light-emitting thyristors can be lighted up at the same time.

(Description of SLED Operations)

Now, operations of the circuit in FIG. 12 will be described. It is supposed that 5 V is applied to the line of VGK and a voltage supplied to each of the lines of Φ1, Φ2, and ΦW1 to ΦW4 is 5 V. When the shift thyristor Tn is in an on state, the potential of the common gate Gn of the shift thyristor Tn and the light-emitting thyristors connected to the shift thyristor Tn is reduced to approximately 0.2 V. The common gate Gn and another gate Gn+1 are connected by a coupling diode Dn, and thus a potential difference substantially equal to the diffusion potential of the coupling diode Dn is generated. In this embodiment, the diffusion potential of the coupling diode is approximately 1.5 V. Then, Gn+1 is at a potential equal to the Gn potential of 0.2 V plus the diffusion potential of 1.5 V, i.e., 1.7 V. Thereafter, in the same manner as described, Gn+2 is at a potential of 3.2 V and Gn+3 is at a potential of 4.7 V. However, each of a gate Gn+4 and its following gates is at a potential of 5 V because VGK is 5 V and a potential higher than 5 V cannot be provided. Further, each gate preceding Gn (on the left side in FIG. 12), to which the voltage VGK itself is applied due to reverse biasing of the coupling diode, is at 5 V.

Figure 13A:
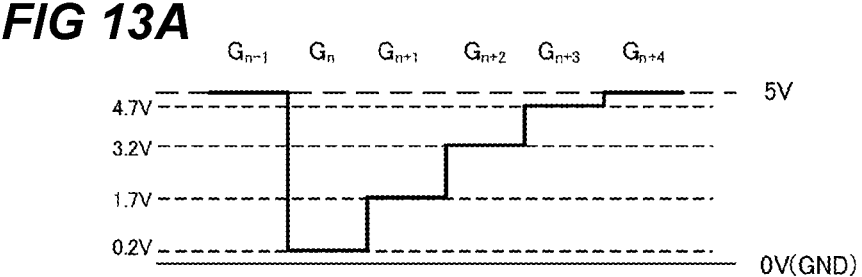
FIGS. 13A, 13B, and 13C are views illustrating distributions of a gate potential of a shift thyristor.

FIG. 13A illustrates the above-described gate-potential distribution during an on state of the shift thyristor Tn. A voltage required to turn on each shift thyristor (hereinafter referred to as a threshold voltage) is substantially equal to each gate potential plus the diffusion potential. When the shift thyristor Tn is turned on, Tn+2 has the lowest gate potential among thyristors connected to the same line of Φ1. The gate Gn+2 of Tn+2 is at a potential of 3.2 V as described above, and thus the threshold voltage of Tn+2 is 4.7 V.

Figure 13B:
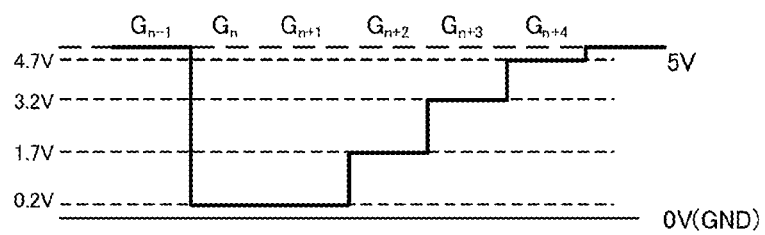
Figure 13C:
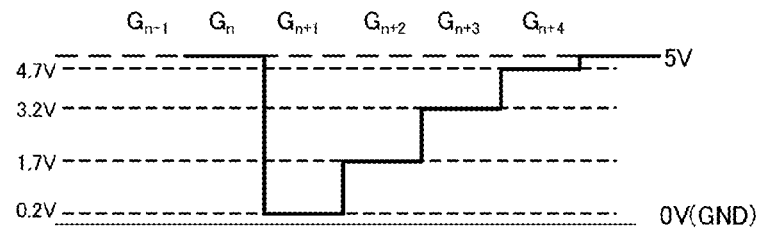

However, as the shift thyristor Tn is turned on, the potential of the line of Φ1 is reduced under the influence of the diffusion potential of approximately 1.5 V and becomes lower than the threshold voltage of Tn+2. Thus, Tn+2 cannot be turned on. The threshold voltage of each of the other shift thyristors connected to the same line of Φ1 is higher than that of Tn+2, and thus also the other shift thyristors cannot be turned on while only Tn can be kept in an on state. Meanwhile, regarding shift thyristors connected to the line of Φ2, the threshold voltage of Tn+1 that has the lowest threshold voltage is 3.2 V and the threshold voltage of Tn+3 that has the second lowest threshold voltage is 6.2 V. When 5 V is supplied to the line of Φ2 in the foregoing state, only Tn+1 can make a transition to an on state. In this situation, Tn and Tn+1 are turned on at the same time, and the gate potential of each shift thyristor located on the right side of Tn+1 becomes lower by the diffusion potential. However, the gate potential of each of a shift thyristor Tn+5 and shift thyristors located on the right side of Tn+5 is 5 V because VGK is 5 V and a gate voltage is controlled by VGK. FIG. 13B illustrates a gate-voltage distribution at that time. When the potential of the line of Φ1 is reduced to 0 V in the above-described situation, the shift thyristor Tn is turned off and the potential of the gate Gn is increased to the potential of VGK. FIG. 13C illustrates a gate-voltage distribution at that time. In this manner, transfer of an on state from the shift thyristor Tn to the shift thyristor Tn+1 is completed.

Next, light-emitting operations of light-emitting thyristors will be described. When only the shift thyristor Tn is turned on, the gate potential of each of four light-emitting thyristors L4n−3 to L4n, which are connected to the gate Gn of Tn in common, is equal to the potential of Gn, i.e., 0.2 V. Thus, each of the light-emitting thyristors has a threshold voltage of 1.7 V and can be lighted up upon supply of a voltage of 1.7 V or higher from the lines of ΦW1 to ΦW4. Then, by supplying a lighting signal to the lines of ΦW1 to ΦW4 during an on state of the shift thyristor Tn, it is possible to selectively cause any of all combinations of the four light-emitting thyristors L4n−3 to L4n to emit light. At that time, the gate Gn+1 of the shift thyristor Tn+1 located next to Tn has a potential of 1.7 V and each of the light-emitting thyristors L4n+1 to L4n+4 connected to the gate Gn+1 in common has a threshold voltage of 3.2 V. As a lighting signal supplied from the lines of ΦW1 to ΦW4 is at 5 V, the light-emitting thyristors L4n+1 to L4n+4 are expected to be lighted up in the same lighting manner as the light-emitting thyristors L4n−3 to L4n. However, when a lighting signal is supplied, the light-emitting thyristors L4n−3 to L4n are turned on earlier than the light-emitting thyristors L4n+1 to L4n+4 because the threshold voltage of the light-emitting thyristors L4n−3 to L4n is lower than that of the light-emitting thyristors L4n+1 to L4n+4. After the light-emitting thyristors L4n−3 to L4n are turned on, the potentials of the lines of ΦW1 to ΦW4 connected thereto are reduced under the influence of the diffusion potential of approximately 1.5 V and become lower than the threshold voltage of the light-emitting thyristors L4n+1 to L4n+4. Thus, the light-emitting thyristors L4n+1 to L4n+4 cannot be turned on. In this manner, connecting a plurality of light-emitting thyristors to a single shift thyristor can light up the plurality of light-emitting thyristors at the same time.

FIG. 14 illustrates examples of waveforms of driving signals. VGK is constantly supplied with 5 V. While the clock signal Φ1 for odd-numbered shift thyristors and the clock signal Φ2 for even-numbered shift thyristors are applied with the same period Tc and 5 V is supplied to the signal Φs for starting, the potential of the signal Φs is reduced to 0 V shortly before Φ1 is raised to 5 V for the first time, to provide a potential difference to a gate line. As a result of this, the potential of the gate of the first shift thyristor is reduced to 1.7 V from 5 V and the threshold voltage becomes equal to 3.2 V, resulting in a state where the first shift thyristor can be turned on by the signal Φ1. With a short delay after 5 V is applied to Φ1 and the first shift thyristor makes a transition to an on state, 5 V is supplied to Φs, and thereafter, Φs is kept being supplied with 5 V. There is formed a configuration in which respective on states (5 V, here) of Φ1 and Φ2 have an overlap Tov in time and Φ1 and Φ2 have a substantially complementary relationship. The signals ΦW1 to ΦW4 for lighting up light-emitting thyristors are transmitted with a period of one-half the period of Φ1 or Φ2. When 5 V is applied to ΦW1 to ΦW4 during an on state of a corresponding shift thyristor, lighting is achieved. For example, at a time a, all of four light-emitting thyristors connected to the same shift thyristor are lighted up, and at a time b, three light-emitting thyristors are lighted up at the same time. Further, at a time c, all of light-emitting thyristors are turned out, and at a time d, two light-emitting thyristors are lighted up at the same time. At a time e, only one light-emitting thyristor is lighted up.

Though the number of light-emitting thyristors connected to a single shift thyristor is set to four in the present embodiment, the number is not limited to that. The number of light-emitting thyristors may be smaller than four or larger than four depending on use. Additionally, while a circuit in which thyristors use a cathode in common has been described above, it is possible to apply the same technique also to a circuit in which thyristors use an anode in common by appropriately reversing the polarities.

(Surface Light-Emitting Thyristor Structure)

Figure 15A:
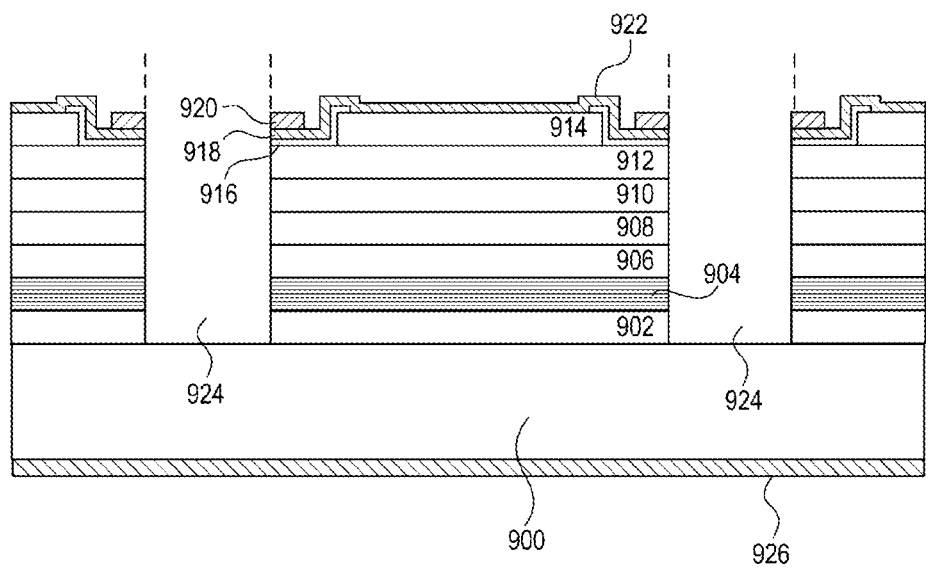
FIGS. 15A and 15B are schematic views of a light-emitting thyristor.
Figure 15B:
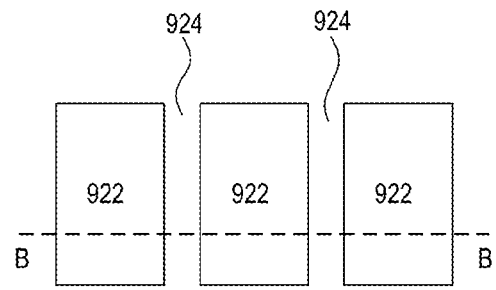

FIGS. 15A and 15B are schematic views of surface light-emitting thyristors according to the present embodiment. FIG. 15B is a plan view of a light-emitting element array in which light-emitting elements formed on a mesa 922 are arranged in plural rows, and FIG. 15A is a schematic view of a section taken along B-B in FIG. 15B. The mesas 922 each having light-emitting elements formed thereon are arranged with predetermined pitches (corresponding to 1200 dpi, for example), and are isolated from each other by element isolation trenches 924.

In FIG. 15A, 900 denotes a compound semiconductor substrate of a first conductivity type, 902 denotes a buffer layer of the same conductivity as the substrate 900, 904 denotes a distributed Bragg reflection (DBR) layer formed of a layered structure of two kinds of semiconductor layers of the first conductivity type, 906 denotes a first first-conductivity-type semiconductor layer, 908 denotes a first second-conductivity-type semiconductor layer of a second conductivity type opposite to the first conductivity type, 910 denotes a second first-conductivity-type semiconductor layer, and 912 denotes a second second-conductivity-type semiconductor layer. Semiconductors of different conductivity types are alternately stacked as the layers 906, 908, 910, and 912 are stacked, thereby forming a pnpn (or npnp) thyristor structure. In the present embodiment, an n-type GaAs substrate is used as the substrate 900, an n-type GaAs layer or an n-type AlGaAs layer is used as the buffer layer 902, and a stacked structure of an n-type layered structure of AlGaAs having a high aluminum composition and AlGaAs having a low aluminum composition is used as the DBR layer 904. N-type AlGaAs is used as the first first-conductivity-type semiconductor layer 906 on the DBR layer, p-type AlGaAs is used as the first second-conductivity-type semiconductor layer 908, n-type AlGaAs is used as the second first-conductivity-type semiconductor layer 910, and p-type AlGaAs is used as the second second-conductivity-type semiconductor layer 912. Further, a mesa-type surface light-emitting element uses a current constriction mechanism to prevent a current from flowing through a side surface of a mesa, thereby improving a light-emitting efficiency.

A current constriction mechanism in the present embodiment will be described. In the present embodiment, a p-type GaP layer 914 is further formed on p-type AlGaAs forming the second second-conductivity-type semiconductor layer 912, and an ITO layer 918 of an n-type transparent conductor is formed on the GaP layer 914. The p-type GaP layer 914 is formed so as to have a sufficiently high impurity concentration in a portion thereof in contact with the transparent-conductor ITO layer 918. When a light-emitting thyristor is forward-biased (a back electrode 926 is grounded and a positive voltage is applied to a front electrode 920, for example), the p-type GaP layer 914, which is formed so as to have a sufficiently high impurity concentration in a portion thereof in contact with the transparent-conductor ITO layer 918, forms a tunnel junction, causing a current to flow therethrough. With this structure, the p-type GaP layer 914 concentrates a current on a portion in contact with the n-type transparent-conductor ITO layer 918, thereby forming a current constriction mechanism. Additionally, in the present embodiment, an interlayer insulating layer 916 is provided between the ITO layer 918 and the p-type AlGaAs layer 912. An additional diode formed by the n-type ITO layer 918 and the p-type AlGaAs layer 912 is reverse-biased in contrast to a light-emitting thyristor that is forward-biased, and a current does not flow in almost all portions except the tunnel junction during forward biasing. Thus, the interlayer insulating layer 916 can be omitted on condition that a reverse breakdown voltage of the additional diode formed by the n-type ITO layer 918 and the p-type AlGaAs layer 912 is sufficient for necessary use. In the above-described configuration, a lower-side semiconductor layered portion substantially corresponding to a portion of contact between the p-type GaP layer 914 and the n-type transparent-conductor ITO layer 918 emits light, almost of which is then reflected by the DBR layer 904 to a side opposite to the substrate and is taken out.

In the exposure head according to the present embodiment, a density of light-emitting points is determined according to a resolution. The light-emitting elements are isolated into mesa structures (mesas 922) by the element isolation trenches 924. In forming an image with a resolution of 1200 dpi, for example, the light-emitting elements are arranged so as to have an interval of 21.16 µm between respective centers of adjacent elements as light-emitting points.

As described above, in the present embodiment, the driver ICs 303a and 303b are placed on opposite sides of the connector 305 and wires are laid in each of the light-emitting element array chips. This enables wiring without local concentration of wires, thereby reducing the size of the printed board without reducing a light quantity. Further, placing the driver ICs 303a and 303b symmetrically along the longitudinal direction of the printed board can reduce deformation caused under the influences of heat above the printed board.

Moreover, placing the driver ICs on a surface opposite to the board's surface on which the light-emitting element array chips are mounted removes positional constraints except the connector in the opposite surface. This allows the driver ICs to be placed in optimal positions for leading out wires therefrom. Furthermore, wires can be led out from immediately under the driver ICs and be connected to the light-emitting element array chips, so that the number of wires to be led out from both ends of the driver ICs along the longitudinal direction of the printed board in the driver ICs can be reduced by the number of signals to be connected. Therefore, the size of the printed board can be reduced.

[Second Embodiment]

Figure 16:
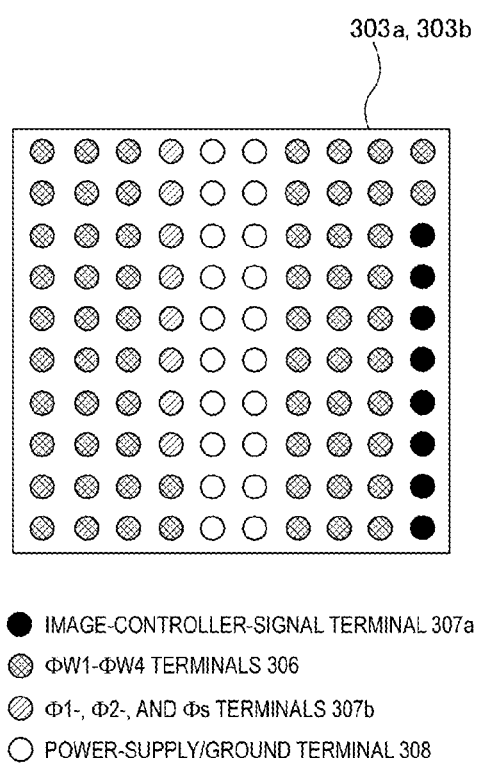
FIG. 16 is a view illustrating a layout of input and output terminals of a driving unit according to a second embodiment.
Figure 17:
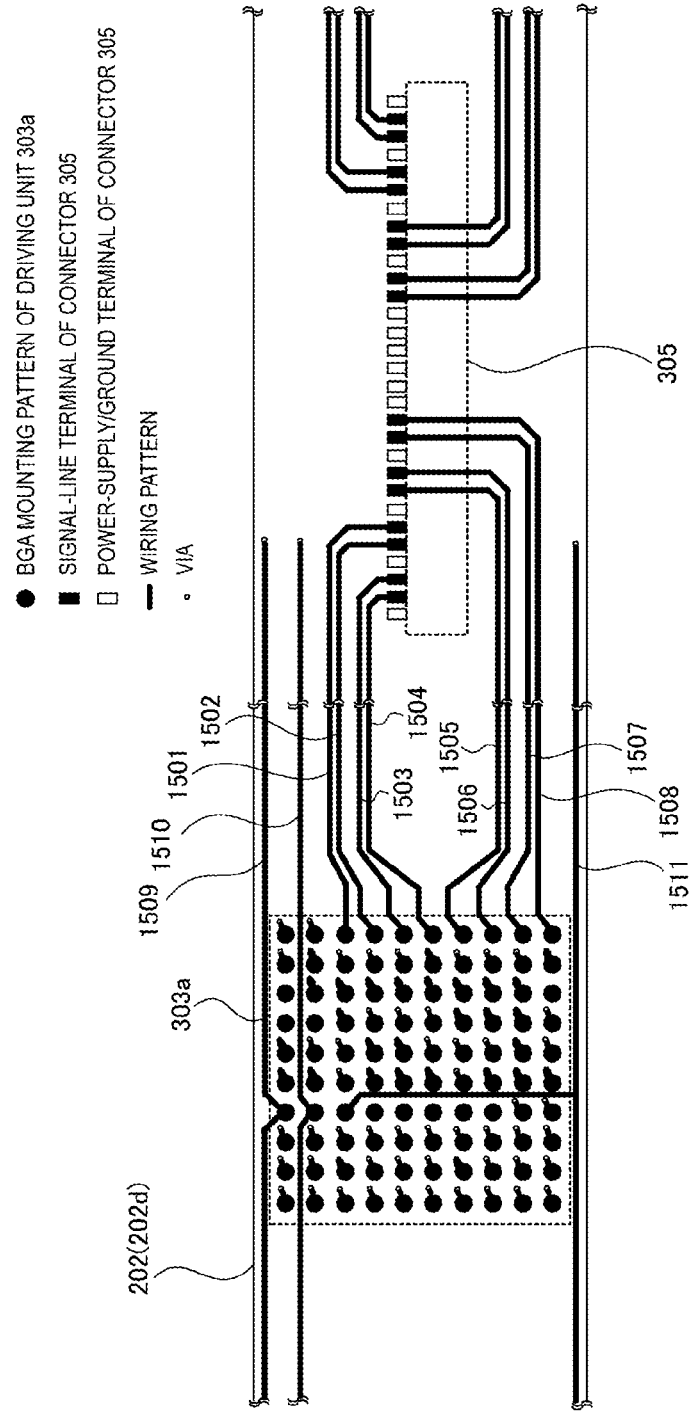
FIG. 17 is a view illustrating a wiring pattern in a fourth layer of a printed board according to the second embodiment.
Figure 18:
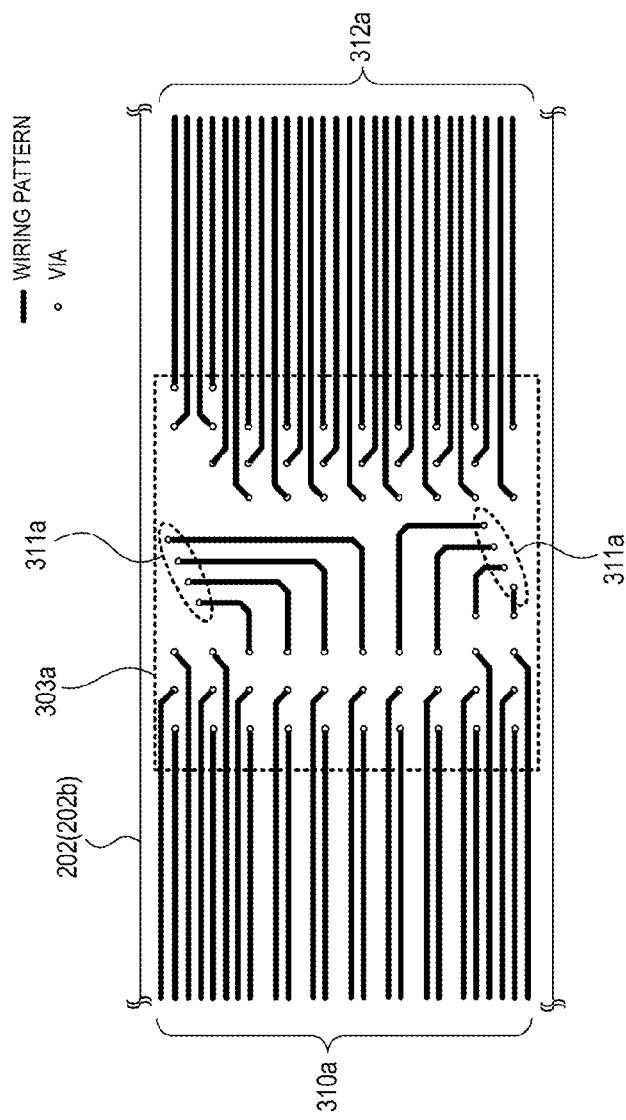
FIG. 18 is a view illustrating a wiring pattern in a second layer of the printed board according to the second embodiment.

Next, an exposure head according to a second embodiment will be described with reference to FIGS. 16, 17, and 18. FIG. 16 is a view illustrating a layout of input and output terminals of a driver IC. FIG. 17 is a view illustrating a wiring pattern in a fourth layer of a printed board. FIG. 18 is a view illustrating a wiring pattern in a second layer of the printed board.

In the present embodiment, a layout of terminals in the driver IC is different from that in the first embodiment, and wiring patterns in the fourth and second layers of the printed board are accordingly different from those in the first embodiment. Below, those differences will be described. The configurations in the other respects (the configuration of the whole of the image forming apparatus, the general configuration of the exposure head) are similar to those in the above-described embodiment, and thus description thereof is omitted here.

In the above-described embodiment, there has been described the configuration in which the output terminals of the driver IC at which driving signals are output to light-emitting element arrays from the driver IC are placed in both ends of the driver IC along the longitudinal direction of the printed board, as an example. More specifically, in the example of a layout of terminals in the driver IC 303a or 303b illustrated in FIG. 6A, there is formed a configuration in which the ΦW1 to ΦW4 terminals 306 are placed externally to the terminals 307a and 307b for Φ1-, Φ2-, and Φs-signals and an image controller signal. However, a layout of the terminals is not limited thereto.

For example, there may be provided a configuration in which input terminals of the driver IC at which control signals are received from the image processing IC through the control signal lines are placed in both ends of the driver IC along the longitudinal direction of the board. More specifically, there may be formed a configuration in which the terminals for Φ1-, Φ2-, and Φs-signals and an image controller signal are placed externally to the ΦW1 to ΦW4 terminals. Further, the driver IC has a function of selecting an input terminal provided on a connector side from the input terminals placed externally to the ΦW1 to ΦW4 terminals. This configuration also can reduce the size of the printed board in the same manner.

Alternatively, as illustrated in FIG. 16, there may be formed a configuration in which the image-controller-signal terminals 307a are placed externally to the ΦW1 to ΦW4 terminals 306. This configuration will be described with reference to FIGS. 16, 17 and 18.

Each of clock signal lines (1501 and 1502) that transmit the above-described image controller signals and data signal lines (1503, 1504, 1505, 1506, 1507, and 1508) has a signal speed that is increased depending on a printing speed of the image forming apparatus or a data amount of each pixel. For example, in an exposure head that performs multilevel printing (that prints an image of one pixel in gradations corresponding to eight bits), in a case where a period of one line is set to 100 µs, the number of light-emitting elements is set to 14964 (a resolution of 1200 dpi and an image width of approximately 316 mm), and the number of data wires is six pairs (two driver ICs and three pairs of signals for one chip), a signal frequency is calculated to be approximately 200 MHz from the following Expression 2.

Signal frequency=(the number of light-emitting elements×the number of gradations)÷(period of one line×the number of data wires). [Expression 2]

As a signal frequency becomes higher, malfunction due to reflection of a signal or a noise is more likely to occur. To avoid malfunction, wiring impedance of a wiring pattern on a printed board needs to be kept constant. As is generally known, when a different signal pattern is in the vicinity of a wiring pattern, the wiring impedance of the wiring pattern varies. In a case where the signal lines 1501 to 1508 are connected to inside terminals (image-controller-signal terminals) of the driver ICs 303a and 303b as illustrated in FIG. 7, wires need to be laid between outside terminals (ΦW1 to ΦW4 terminals) of the driver ICs. Thus, impedance varies by the vicinity of a terminal for a different signal.

A solution to avoid the above-described problem is to provide the driver ICs 303a and 303b with a function of selecting a terminal so that the signal lines 1501 to 1508 for the image controller signals are connected to the outside terminals of the driver ICs 303a and 303b. FIG. 16 illustrates an example in which the image-controller-signal terminals are placed on a connecting-unit-side (connector side) in the driver IC by the terminal selecting function of the driver IC. Further, FIG. 17 illustrates a wiring pattern of the signal lines 1501 to 1508 for the image controller signals in the terminal layout illustrated in FIG. 16. In this example, the signal lines 1501 to 1508 for the image controller signals between the connector 305 and the driver IC 303a are connected to terminals (outside terminals) closest to the connector among the terminals of the driver IC 303a, and thus are wired with no other signal lines being in the vicinity thereof, thereby keeping wiring impedance constant.

FIG. 17 illustrates a wiring pattern extending from the connector 305 to the driver IC 303a in the printed board. The wiring pattern extending from the connector 305 to the driver IC 303a is illustrated. FIG. 18 illustrates a pattern in the second layer of the printed board. Specifically, FIG. 18 illustrates the manner in which the driving signal lines 310a, 311a, and 312a are wired in the second layer. As the terminals 307a for the image controller signals illustrated in FIG. 16 are placed as terminals (outside terminals) closest to the connector, the driving signal lines 312a for the driving signals ΦW1 to ΦW4 that are placed to be connected to the outside terminals of the driver IC 303a in FIG. 9 are placed to be connected to terminals in the center of the driver IC. Additionally, the wiring illustrated in FIG. 18 enables wiring of the driving signal lines 312a without increasing the width of the board.

In this manner, by allowing a terminal of the driver IC 303a or 303b to be selectively placed in an end, it is possible to keep the impedance of a signal line constant without increasing the size of the printed board, thereby forming more stable transmission paths.

[Other Embodiments]

Though the above embodiments have been described by using a four-layer printed board, the board is not limited to that and the number of board layers in the printed board should be appropriately set as needed.

Further, though in the above embodiments, two drivers IC have been described as an example of a plurality of driver ICs and the configuration in which the two driver ICs are placed on opposite sides of the connector has been described as an example, the driver ICs and the configuration are not limited to those. It is simply required to divide wiring paths to light-emitting element array chips among areas, the number of which corresponds to the number of driver ICs. Thus, the number and positions of driver ICs should be appropriately set as needed.

Moreover, though a printer has been described as an example of the image forming apparatus in the above embodiments, an apparatus in the mode carrying out the invention is not limited to that. For example, the image forming apparatus may be another image forming apparatus such as a copying machine or a facsimile, or another different image forming apparatus such as a multifunction apparatus formed of a combination of the functions of the foregoing apparatuses. Applying the present invention to an exposure head used in the above-described image forming apparatuses can attain the same effects.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An exposure head that exposes a photosensitive member to light, comprising:
    a first board that is a long board;
    a plurality of light-emitting element array chips that are mounted on one surface of the first board and arranged along a longitudinal direction of the first board;
    a connector mounted on the other surface opposite to the one surface of the first board, the connector being configured to make connection to an image processing IC mounted on a second board different from the first board;
    a first driver IC mounted on the other surface opposite to the one surface of the first board, the first driver IC being arranged on one side of the first board with respect to the connector in the longitudinal direction of the first board, the first driver IC being connected to the connector and being configured to drive the light-emitting element array chips; and
    a second driver IC mounted on the other surface opposite to the one surface of the first board, the second driver IC being arranged on the other side of the first board with respect to the connector in the longitudinal direction of the first board, the second driver IC being connected to the connector and being configured to drive the light-emitting element array chips, wherein
    the first driver IC, the second driver IC, and the connector are mounted on the first board in an area that overlaps an area where the plurality of light-emitting element array chips are mounted, along a vertical direction vertical to the surfaces of the first board,
    the first driver IC drives a device group including a plurality of light-emitting element array chips arranged on a side where the first driver IC is placed with respect to a center of the first board in the longitudinal direction of the first board among the plurality of light-emitting element array chips arranged along the longitudinal direction, and
    the second driver IC drives a device group including a plurality of light-emitting element array chips arranged on a side where the second driver IC is placed with respect to the center of the first board in the longitudinal direction of the first board among the plurality of light-emitting element array chips arranged along the longitudinal direction.

2. The exposure head according to claim 1, wherein
the first board is a four-layer board including a first layer, a second layer, a third layer, and a fourth layer that are stacked in the stated order,
the first layer is the one surface on which the light-emitting element array chips are mounted and the fourth layer is the other surface on which the first driver IC, the second driver IC, and the connector are mounted,
a control signal line that extends from the image processing IC and is connected to the first driver IC and the second driver IC through the connector is wired in the fourth layer,
a driving signal line that extends from the first driver IC and the second driver IC and is wired to each of the light-emitting element array chips is wired in the second layer, and
a power-supply/ground pattern is wired in the third layer provided between the second layer and the fourth layer along the vertical direction.

3. The exposure head according to claim 1, wherein
output terminals of the first driver IC at which driving signals are output to the light-emitting element array chips from the first driver IC are placed in both ends of the first driver IC in the longitudinal direction,
output terminals of the second driver IC at which driving signals are output to the light-emitting element array chips from the second driver IC are placed in both ends of the second driver IC in the longitudinal direction, and
each of the first driver IC and the second driver IC has a function of selecting an output terminal to be used.

4. The exposure head according to claim 3, wherein
each of the first driver IC and the second driver IC is placed at a position that allows a difference between the number of wires led out from each of the first driver IC and the second driver IC to one side of the first board in the longitudinal direction of the first board and the number of wires led out from each of the first driver IC and the second driver IC to the other side of the first board in the longitudinal direction of the first board to be equal to or smaller than the number of wires for one of the light-emitting element array chips.

5. The exposure head according to claim 1, wherein
input terminals of the first driver IC at which control signals are received from the image processing IC through a control signal line are placed in both ends of the first driver IC in the longitudinal direction,
input terminals of the second driver IC at which control signals are received from the image processing IC through a control signal line are placed in both ends of the second driver IC in the longitudinal direction, and
each of the first driver IC and the second driver IC has a function of selecting an input terminal to be used.

6. The exposure head according to claim 5, wherein
the input terminals of the first driver IC at which the control signals are received from the image processing IC through the control signal line are placed in an end on a side where the connector is placed, out of both ends of the first driver IC in the longitudinal direction, and
the input terminals of the second driver IC at which the control signals are received from the image processing IC through the control signal line are placed in an end on a side where the connector is placed, out of both ends of the second driver IC in the longitudinal direction.

7. The exposure head according to claim 1, wherein
the first driver IC is placed at a position astride two light-emitting element array chips among the plurality of light-emitting element array chips forming the device group driven by the first driver IC, along the longitudinal direction, and
the second driver IC is placed at a position astride two light-emitting element array chips among the plurality of light-emitting element array chips forming the device group driven by the second driver IC, along the longitudinal direction.

8. The exposure head according to claim 1, wherein a distance from the connector to the first driver IC along the longitudinal direction of the first board is substantially equal to a distance from the connector to the second driver IC along the longitudinal direction of the first board.

9. The exposure head according to claim 8, wherein the connector is placed in a central portion of the first board in the longitudinal direction of the first board.

10. An image forming apparatus comprising:
a photosensitive member;
an exposure head configured to expose the photosensitive member to light based on image data to form an electrostatic latent image on the photosensitive member; and
a development device configured to develop the electrostatic latent image formed on the photosensitive member with toner, wherein
the exposure head includes:
a first board that is a long board;
a plurality of light-emitting element array chips that are mounted on one surface of the first board and arranged along a longitudinal direction of the first board;
a connector mounted on the other surface opposite to the one surface of the first board, the connector being configured to make connection to an image processing IC mounted on a second board different from the first board;
a first driver IC mounted on the other surface opposite to the one surface of the first board, the first driver IC being arranged on one side of the first board with respect to the connector in the longitudinal direction of the first board, the first driver IC being connected to the connector and being configured to drive the light-emitting element array chips; and
a second driver IC mounted on the other surface opposite to the one surface of the first board, the second driver IC being arranged on the other side of the first board with respect to the connector in the lengthwise direction of the first board, the second driver IC being connected to the connector and being configured to drive the light-emitting element array chips, wherein
the first driver IC, the second driver IC, and the connector are mounted on the first board in an area that overlaps an area where the plurality of light-emitting element array chips are mounted, along a vertical direction vertical to the surfaces of the first board,
the first driver IC drives a device group including a plurality of light-emitting element array chips arranged on a side where the first driver IC is placed with respect to a center of the first board in the longitudinal direction of the first board among the plurality of light-emitting element array chips arranged along the longitudinal direction, and
the second driver IC drives a device group including a plurality of light-emitting element array chips arranged on a side where the second driver IC is placed with respect to the center of the first board in the longitudinal direction of the first board among the plurality of light-emitting element array chips arranged along the longitudinal direction.

11. The image forming apparatus according to claim 10, wherein
the first board is a four-layer board including a first layer, a second layer, a third layer, and a fourth layer that are stacked in the stated order,
the first layer is the one surface on which the light-emitting element array chips are mounted and the fourth layer is the other surface on which the first driver IC, the second driver IC, and the connector are mounted,
a control signal line that extends from the image processing IC and is connected to the first driver IC and the second driver IC through the connector is wired in the fourth layer,
a driving signal line that extends from the first driver IC and the second driver IC and is wired to each of the light-emitting element array chips is wired in the second layer, and
a power-supply/ground pattern is wired in the third layer provided between the second layer and the fourth layer along the vertical direction.

12. The image forming apparatus according to claim 10, wherein
output terminals of the first driver IC at which driving signals are output to the light-emitting element array chips from the first driver IC are placed in both ends of the first driver IC in the longitudinal direction,
output terminals of the second driver IC at which driving signals are output to the light-emitting element array chips from the second driver IC are placed in both ends of the second driver IC in the longitudinal direction, and
each of the first driver IC and the second driver IC has a function of selecting an output terminal to be used.

13. The image forming apparatus according to claim 12, wherein
each of the first driver IC and the second driver IC is placed at a position that allows a difference between the number of wires led out from each of the first driver IC and the second driver IC to one side of the first board in the longitudinal direction of the first board and the number of wires led out from each of the first driver IC and the second driver IC to the other side of the first board in the longitudinal direction of the first board to be equal to or smaller than the number of wires for one of the light-emitting element array chips.

14. The image forming apparatus according to claim 10, wherein
input terminals of the first driver IC at which control signals are received from the image processing IC through a control signal line are placed in both ends of the first driver IC in the longitudinal direction,
input terminals of the second driver IC at which control signals are received from the image processing IC through a control signal line are placed in both ends of the second driver IC in the longitudinal direction, and
each of the first driver IC and the second driver IC has a function of selecting an input terminal to be used.

15. The image forming apparatus according to claim 14, wherein
the input terminals of the first driver IC at which the control signals are received from the image processing IC through the control signal line are placed in an end on a side where the connector is placed, out of both ends of the first driver IC in the longitudinal direction, and
the input terminals of the second driver IC at which the control signals are received from the image processing IC through the control signal line are placed in an end on a side where the connector is placed, out of both ends of the second driver IC in the longitudinal direction.

16. The image forming apparatus according to claim 10, wherein
the first driver IC is placed at a position astride two light-emitting element array chips among the plurality of light-emitting element array chips forming the device group driven by the first driver IC, along the longitudinal direction, and
the second driver IC is placed at a position astride two light-emitting element array chips among the plurality of light-emitting element array chips forming the device group driven by the second driver IC, along the longitudinal direction.

17. The image forming apparatus according to claim 10, wherein a distance from the connector to the first driver IC along the longitudinal direction of the first board is substantially equal to a distance from the connector to the second driver IC along the longitudinal direction of the first board.

18. The image forming apparatus according to claim 17, wherein the connector is placed in a central portion of the first board in the longitudinal direction of the first board.

* * * * *